(12) United States Patent
Ishida et al.

(10) Patent No.: US 7,731,613 B2
(45) Date of Patent: Jun. 8, 2010

(54) V-BELT TYPE CONTINUOUSLY VARIABLE TRANSMISSION, SADDLE-RIDE TYPE VEHICLE, AND METHOD OF MANUFACTURING THE V-BELT TYPE CONTINUOUSLY VARIABLE TRANSMISSION

(75) Inventors: Yousuke Ishida, Shizuoka (JP); Akifumi Ooishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 287 days.

(21) Appl. No.: 11/468,208

(22) Filed: Aug. 29, 2006

(65) Prior Publication Data
US 2007/0202975 A1    Aug. 30, 2007

(30) Foreign Application Priority Data
Aug. 30, 2005    (JP) .............................. 2005-248825

(51) Int. Cl.
F16H 59/00    (2006.01)
F16H 61/00    (2006.01)
F16H 63/00    (2006.01)
(52) U.S. Cl. ........................................................ 474/19
(58) Field of Classification Search .................. 474/14, 474/12; 180/218
See application file for complete search history.

(56) References Cited

U.S. PATENT DOCUMENTS

| | | | | |
|---|---|---|---|---|
| 2,851,894 A | * | 9/1958 | Seyfarth | 474/16 |
| 3,616,706 A | * | 11/1971 | Shimamoto | 474/19 |
| 3,908,475 A | * | 9/1975 | Takagi et al. | 474/12 |
| 3,975,964 A | * | 8/1976 | Adams | 474/15 |
| 4,179,946 A | * | 12/1979 | Kanstoroom | 474/16 |
| 5,885,186 A | * | 3/1999 | Van Wijk et al. | 477/43 |
| 6,120,399 A | * | 9/2000 | Okeson et al. | 474/14 |
| 6,334,826 B1 | | 1/2002 | Takagi | |
| 2002/0029916 A1 | * | 3/2002 | Inaoka et al. | 180/218 |
| 2002/0119846 A1 | | 8/2002 | Kitai et al. | |

FOREIGN PATENT DOCUMENTS

| | | |
|---|---|---|
| EP | 1375977 A2 | 1/2004 |
| JP | 09-026006 | 1/1997 |
| JP | 2002-106658 | 4/2002 |
| JP | 2003-301903 | 10/2003 |

OTHER PUBLICATIONS

European Search report for corresponding European Application No. 06018146.8 lists the references above.

* cited by examiner

*Primary Examiner*—John Q Nguyen
*Assistant Examiner*—Henry Liu
(74) *Attorney, Agent, or Firm*—Keating & Bennett, LLP

(57) ABSTRACT

A stationary sheave half of a V-belt type continuously variable transmission (CVT) comprises a primary sheave mounted to a primary sheave shaft and a secondary sheave mounted to a secondary sheave shaft. The stationary sheave half of the secondary sheave comprises a sheave body, which is substantially in the form of a doughnut plate and around which a V-belt is wound, and a substantially cylindrical-shaped boss portion extending rightward from a right side of the sheave body. The sheave body and the boss portion are formed separately.

6 Claims, 17 Drawing Sheets

V-BELT TYPE CONTINUOUSLY VARIABLE TRANSMISSION, SADDLE-RIDE TYPE VEHICLE, AND METHOD OF MANUFACTURING THE V-BELT TYPE CONTINUOUSLY VARIABLE TRANSMISSION

RELATED APPLICATIONS

This application claims the benefit of priority under 35 USC 119 of Japanese patent application no. 2005-248825, filed on Aug. 30, 2005, which application is hereby incorporated by reference in its entirety.

BACKGROUND OF THE INVENTION

1. Field of the Invention

The present invention relates to a V-belt type continuously variable transmission, a saddle-ride type vehicle provided with the V-belt type continuously variable transmission, and a method of manufacturing the V-belt type continuously variable transmission.

2. Description of Related Art

A motorcycle with a V-belt type continuously variable transmission is known (see, for example, JP-A-2003-301903, JP-A-2002-106658 and JP-A-09-026006). As described below, there is a problem associated with the process of assembling such conventional V-belt type continuously variable transmissions.

FIGS. 13-17 illustrate an assembly process of a conventional V-belt type continuously variable transmission in a motorcycle. FIG. 13 shows a state, in which assembly of the V-belt type continuously variable transmission is finished. A V-belt type continuously variable transmission (referred below to as CVT) 530 comprises a primary sheave 571, a secondary sheave 572, and a V-belt 573 wound around the primary sheave 571 and the secondary sheave 572.

The primary sheave 571 comprises a stationary sheave half 571a positioned outward in a vehicle width direction (a left and right direction in the figure) and a movable sheave half 571b positioned inward in the vehicle width direction and opposed to the stationary sheave half 571a. The stationary sheave half 571a is clamped and fixed to a right end of a primary sheave shaft 546c by a lock nut 615 to rotate with the primary sheave shaft 546c. The movable sheave half 571b rotates with the primary sheave shaft 546c and is slidable axially of the primary sheave shaft 546c. Also, a cam surface 611 is formed on a left portion of the movable sheave half 571b and a cam plate 612 is arranged on the left of the cam surface 611. A roller weight 613 is arranged between the cam surface 611 and the cam plate 612.

The secondary sheave 572 comprises a stationary sheave half 572a positioned inward in the vehicle width direction and a movable sheave half 572b positioned outward in the vehicle width direction and opposed to the stationary sheave half 572a. The movable sheave half 572b is mounted to the right end of a secondary sheave shaft 562. The movable sheave half 572b rotates with the secondary sheave shaft 562 and is slidable axially of the secondary sheave shaft 562. The stationary sheave half 572a comprises a sheave body 572c, which is substantially in the form of a doughnut plate and around which a V-belt 573 is wound, and a substantially cylindrical-shaped boss portion 572d extending rightward from a right side of the sheave body 572c. The sheave body 572c and the boss portion 572d are welded to each other to be formed as an integral body. Also, the boss portion 572d is spline-fitted onto the secondary sheave shaft 562.

A cylindrical-shaped boss 617 fixed to a shaft core of the movable sheave half 572b is provided on the boss portion 572d to be slidable axially of the boss portion 572d. A slide groove 617a is formed on the boss 617 to be slit. A guide pin 618 is implanted in the boss portion 572d and engages slidably with the slide groove 117a so as to rotate with the boss 617.

A spring bearing member 619 comprising an annular plate is mounted on a tip end of the boss portion 572d of the stationary sheave half 572a by a circlip 619a. A coil spring 620 in a compressed state is interposed between the spring bearing member 619 and the movable sheave half 572b. The secondary sheave shaft 562 and the stationary sheave half 572a are fixed to each other by a lock nut 616 provided on the secondary sheave shaft 562.

In an assembling process of the CVT 530, the secondary sheave 572 is assembled separately and mounted to the secondary sheave shaft 562, and then the movable sheave half 571b and the stationary sheave half 571a of the primary sheave 571 are sequentially mounted to the primary sheave shaft 546c.

That is, as shown in FIG. 14, for the primary sheave 571, the cam plate 612 and the movable sheave half 571b are inserted through the primary sheave shaft 546c. Subsequently, the V-belt 573 is wound around the primary sheave 571 and the secondary sheave 572 in a state in which the stationary sheave half 571a is not mounted to the primary sheave shaft 546c.

When the CVT 530 is used, the boss 617 of the movable sheave half 572b and the stationary sheave half 572a on the secondary sheave 572 do not abut against each other. In the state described above, however, the movable sheave half 572b is exerted by only the bias of the coil spring 620, so that it is put in a state of abutting against the stationary sheave half 572a. Therefore, a clearance between the movable sheave half 572b and the stationary sheave half 572a, that is, a belt groove, becomes narrow and a part of the V-belt 573 protrudes from the secondary sheave 572. In order to move the V-belt 573 toward a center of the secondary sheave 572, it is necessary to separate the stationary sheave half 572a and the movable sheave half 572b from each other against the bias of the coil spring 620.

When attempting to mount the stationary sheave half 571a (indicated by two-dot chain line in the figure) of the primary sheave 571 to the primary sheave shaft 546c as shown in FIG. 15, in a state in which the V-belt 573 shown in FIG. 14 protrudes, the stationary sheave half 571a cannot be arranged in an appropriate position since the V-belt 573 approaches excessively toward a center. Attempting to forcibly clamp the lock nut 615 (see FIG. 13) in such state creates a risk of breaking stationary sheave half 571a or the V-belt 573.

Therefore, in a conventional assembling process, a jig (not shown) or the like is used as shown in FIG. 16 to enlarge an interval between the stationary sheave half 572a and the movable sheave half 572b on the secondary sheave 572 to move the V-belt 573 toward a center of the secondary sheave 572. At this time, the V-belt 573 is arranged outward relative to a position, shown in FIG. 15, on the primary sheave 571. While this state is maintained, the stationary sheave half 571a of the primary sheave 571 is mounted to the primary sheave shaft 546c to clamp the lock nut 615 as shown in FIG. 17. In the state shown in FIG. 17, the stationary sheave half 571a of the primary sheave 571 is clamped and fixed by the lock nut 615 in an appropriate position. When the jig is removed after the stationary sheave half 571a is mounted in this position, the V-belt 573 is also arranged in an appropriate position.

As described above, in a conventional assembling process of the CVT, the interval between the stationary sheave half 572a and the movable sheave half 572b on the secondary sheave 572 must be forcibly enlarged against the bias of the coil spring 620. In addition, while the interval is enlarged, it is necessary to move the V-belt 573 outwardly of the primary sheave 571 (see FIG. 16) and to mount the stationary sheave half 571a of the primary sheave 571 while maintaining such state (see FIG. 17). Accordingly, with the conventional process, an exclusive jig is needed, a large force is necessary, and the process is complicated. Therefore, the manufacture of the CVT is not satisfactory in yield.

Also, the boss portion 572d, which constitutes the stationary sheave half 572a of the secondary sheave 572, is usually subjected to surface treatment as by plating processing in order to prevent abrasion. Since the stationary sheave half 572a is formed integrally by fixing the sheave body 572c and the boss portion 572d together, however, it is necessary to apply masking for surface treatment only on the boss portion 572d, so that work becomes complicated.

Further, since the sheave body 572c and the boss portion 572d are fixed together by means of welding processing, increased manufacturing costs and deterioration in processing accuracy are liable to occur. On the other hand, it is possible to fix the sheave body 572c and the boss portion 572d together by means of rivets. In case of fixation with rivets, however, the secondary sheave 572 is increased in size (in particular, increased in diameter), which is disadvantageous in terms of arrangement space.

SUMMARY OF THE INVENTION

The invention overcomes these drawbacks and provides a V-belt type continuously variable transmission that simplifies an assembling process, does not increase manufacturing cost, prevents deterioration in processing accuracy and is free from a disadvantage in terms of arrangement space.

A first embodiment of the invention is a V-belt type continuously variable transmission having first and second sheave shafts, first and second sheaves rotating with the first and second sheave shafts, and a V-belt wound around the first and second sheaves. The second sheave comprises a first sheave half that rotates with the second sheave shaft, a second sheave half that rotates with the second sheave shaft and is axially movable, and an elastic body that biases the second sheave half toward the first sheave half. The first sheave half comprises a sheave body around which the V-belt is wound, and a boss portion that is formed separately from the sheave body and extends axially from a shaft core of the sheave body, and to which the elastic body is directly or indirectly mounted.

A second embodiment of the invention is a V-belt type continuously variable transmission having a primary sheave, a secondary sheave, a primary sheave shaft that rotates the primary sheave, a secondary sheave shaft that rotates following the secondary sheave, and a V-belt wound around the primary sheave and the secondary sheave. The secondary sheave comprises a first sheave half that rotates with the secondary sheave shaft, and a second sheave half that rotates with the secondary sheave shaft and is axially movable. The first sheave half comprises a sheave body around which the V-belt is wound, and a boss portion formed separately from the sheave body and extending axially from a shaft core of the sheave body.

The V-belt type continuously variable transmissions of the first and second inventions may adopt an inventive assembling method. First, the sheave body and the boss portion on the first sheave half are separate from each other and only the sheave body is mounted to the sheave shaft. Also, the boss fixed to the shaft core of the second sheave half, a guide pin engaged by the slide groove formed on the boss, an elastic body such as a coil spring or the like, etc. are first mounted to a boss portion, which is separate from the sheave body, to be made integral therewith. After a V-belt is wound around the primary sheave and the secondary sheave in this state to be held in an appropriate position, the boss portion beforehand made integral is mounted to the sheave shaft and clamped by a lock nut to assemble a V-belt type continuously variable transmission. Thereby, except the last process of clamping with the lock nut, there is no process, in which a large force is needed, and there is no complicated work, so that the assembling process is simplified.

Also, since welding or riveting of the sheave body and the boss portion is not needed, manufacturing costs are not increased.

Further, deterioration in processing accuracy by welding or increase in size (in particular, increased diameter) by use of rivets or the like, and consequent disadvantage in terms of arrangement space, is avoided.

According to the invention, the assembling process of a V-belt type continuously variable transmission is simplified. There is no increase in manufacturing cost, deterioration in processing accuracy or disadvantage in terms of arrangement space.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiments of the invention are described below in detail with reference to the drawings.

First Embodiment

Figure 1:
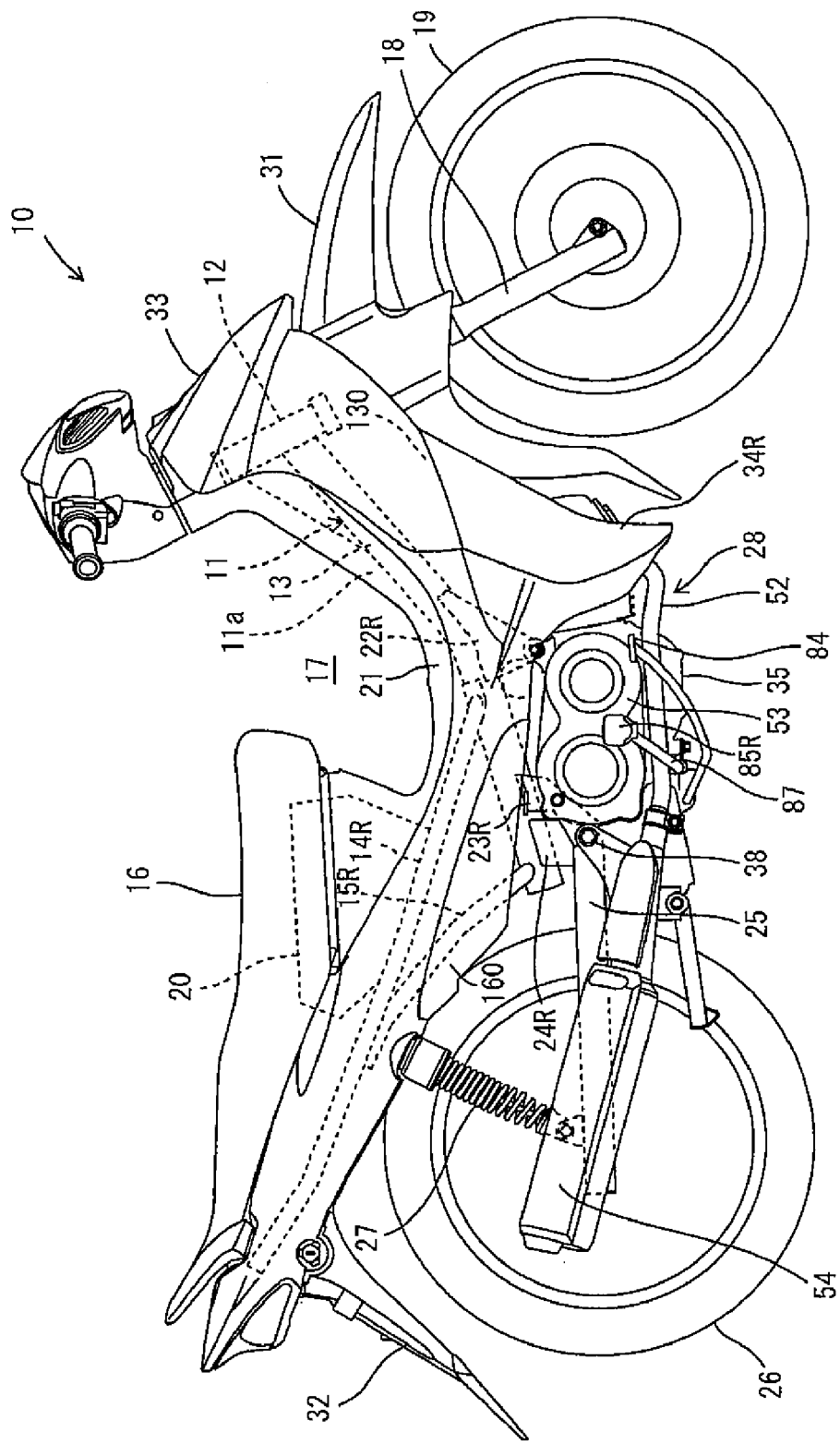
FIG. 1 is a side view of a motorcycle according to a first embodiment of the invention.

As shown in FIG. 1, a saddle-ride type vehicle according to the embodiment comprises a motorcycle 10. The motorcycle 10 comprises a vehicle body frame 11 defining a framework, and a seat 16 on which a passenger is seated. The motorcycle 10 is a so-called moped type motorcycle. More specifically, a space 17 which extends downwardly and is concave-shaped as viewed in side view, is formed forwardly of the seat 16, and a passenger seated on the seat 16 straddles the vehicle body frame 11 to ride thereon. The term "moped type" referred to herein simply represents a kind of a vehicle in terms of shape, does not limit a maximum speed, a displacement volume, etc. of a vehicle, and does not limit the size of a vehicle.

The invention is not limited to a moped type motorcycle but may be implemented in another motorcycle such as one in which a fuel tank is arranged in front of a seat, etc. Also, the invention may be implemented in other saddle-ride type vehicles such as a four-wheeled buggy, etc.

Forward and rearward, and left and right directions in the following descriptions mean directions from the perspective of a passenger seated on the seat 16. The vehicle body frame 11 comprises a steering head pipe 12, a single main frame 13 extending rearwardly and obliquely downwardly of the steering head pipe 12, left and right seat rails 14L, 14R extending rearwardly and obliquely upwardly of an intermediate portion of the main frame 13, and left and right seat pillar tubes 15L, 15R connected to a rear end of the main frame 13 and intermediate portions of the seat rails 14L, 14R.

Upper and left and right sides of the vehicle body frame 11 are covered by a vehicle body cover 21. The space 17, which extends downwardly and is concave-shaped as viewed in side view, is compartmented upwardly of the vehicle body cover 21 and forwardly of the seat 16. Also, a center tunnel 11a, which defines a passage for the main frame 13, is compartmented downwardly of the vehicle body cover 21.

A front wheel 19 is supported on the steering head pipe 12 through a front fork 18. A fuel tank 20 and the seat 16 are supported on the seat rails 14L, 14R. The seat 16 is extended toward rear ends of the seat rails 14L, 14R from above the fuel tank 20. The fuel tank 20 is arranged above front halves of the seat rails 14L, 14R and covered by the vehicle body cover 21 and the seat 16.

A pair of first left and right engine brackets 22L, 22R are provided on the intermediate portion of the main frame 13 to project downward. Provided on a rear end of the main frame 13 are pairs of second left and right engine brackets 23L, 23R and rear arm brackets 24L, 24R. In addition, the brackets provided on the main frame 13, etc. specifically, the first engine brackets 22L, 22R, the second engine brackets 23L, 23R, the rear arm brackets 24L, 24R, etc. define a part of the vehicle body frame 11.

The rear arm brackets 24L, 24R project downward from the rear end of the main frame 13. A pivot shaft 38 is provided on the rear arm brackets 24L, 24R and a front end of a rear arm 25 is supported on the pivot shaft 38 to be able to swing. A rear wheel 26 is supported on a rear end of the rear arm 25. A rear half of the rear arm 25 is suspended from the vehicle body frame 11 through a cushioning unit 27.

Figure 5:
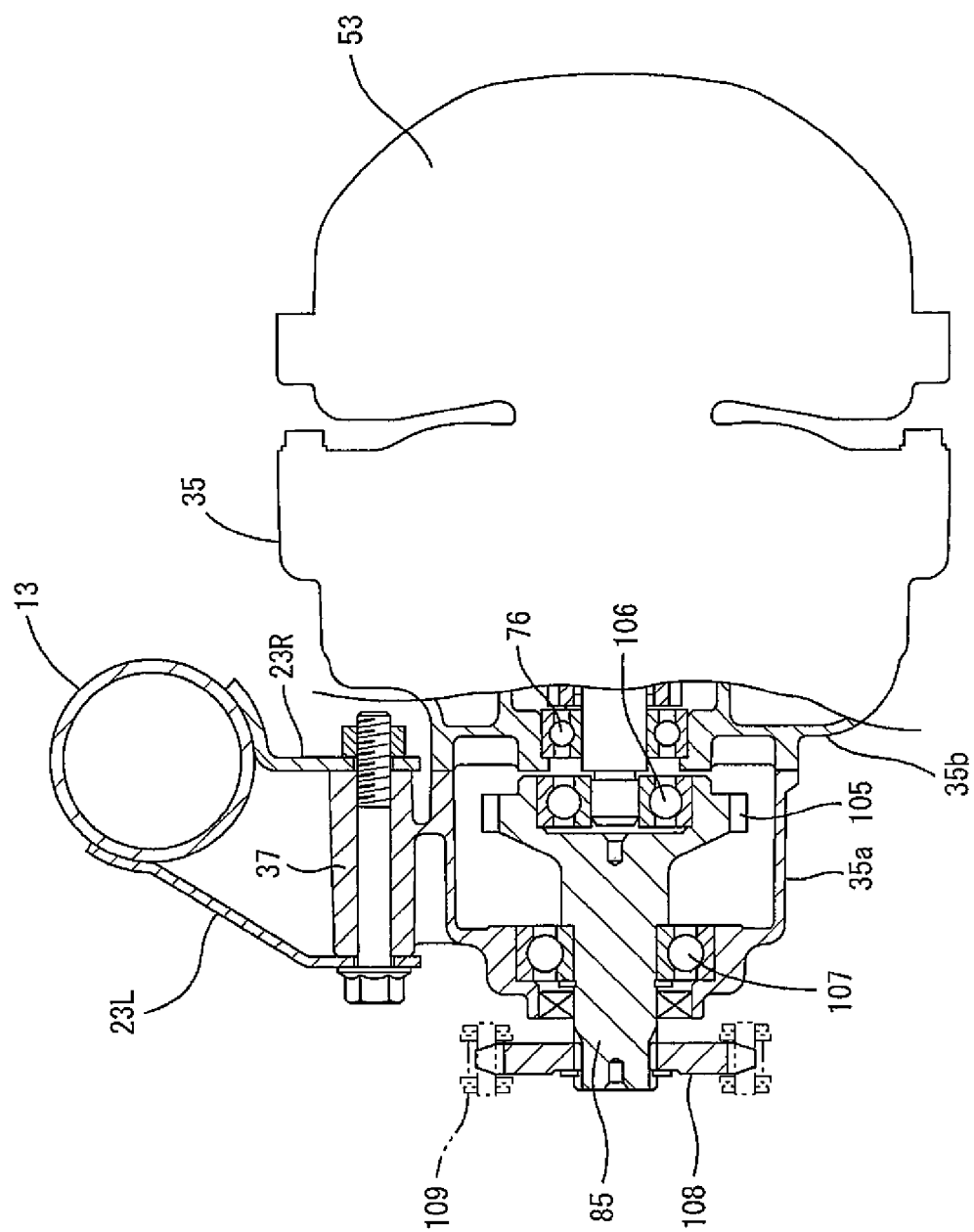
FIG. 5 is a cross sectional view of a state in which the engine unit of the invention is mounted.

As shown in FIG. 5, the second engine brackets 23L, 23R project downward from the rear end of the main frame 13. The second left and right engine brackets 23L, 23R are opposed to each other with an interval in a vehicle width direction.

Figure 4:
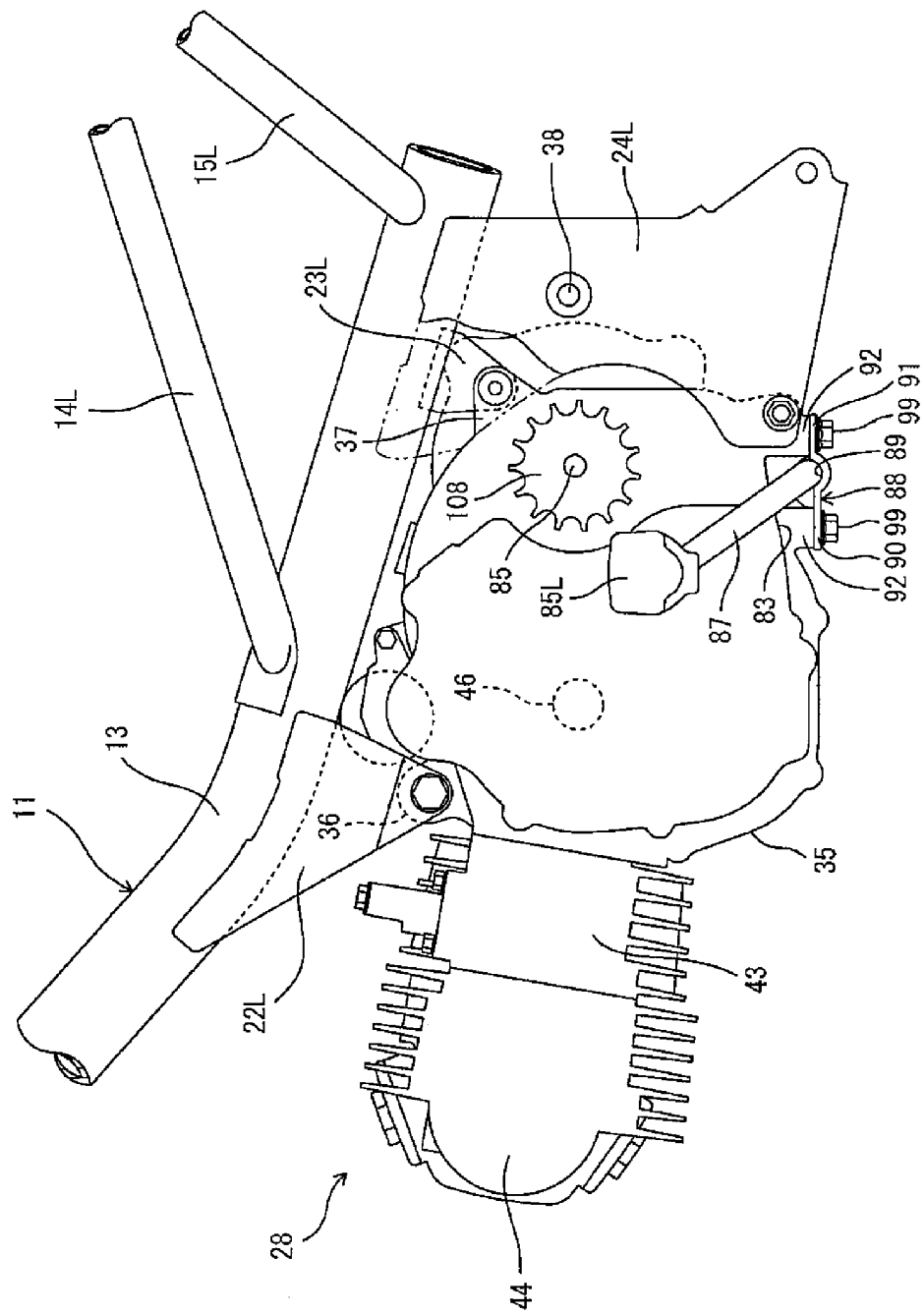
FIG. 4 is a left side view of the engine unit of the invention.

As shown in FIG. 1, an engine unit 28 that drives the rear wheel 26 is supported on the vehicle body frame 11. Engine unit 28 comprises a crankcase 35, a cylinder 43, and a cylinder head 44, as shown in FIG. 4. The crankcase 35 comprises first and second engine mounts 36, 37. The first engine mount 36 projects upward from an upper side of a front end of the crankcase 35 to be supported on the first engine brackets 22L, 22R. The second engine mount 37 projects rearward and obliquely upward from an upper side of a rear end of the crankcase 35 to be supported on the second engine brackets 23L, 23R (also, see FIG. 5). Therefore, the crankcase 35 is suspended from the main frame 13.

Figure 6:
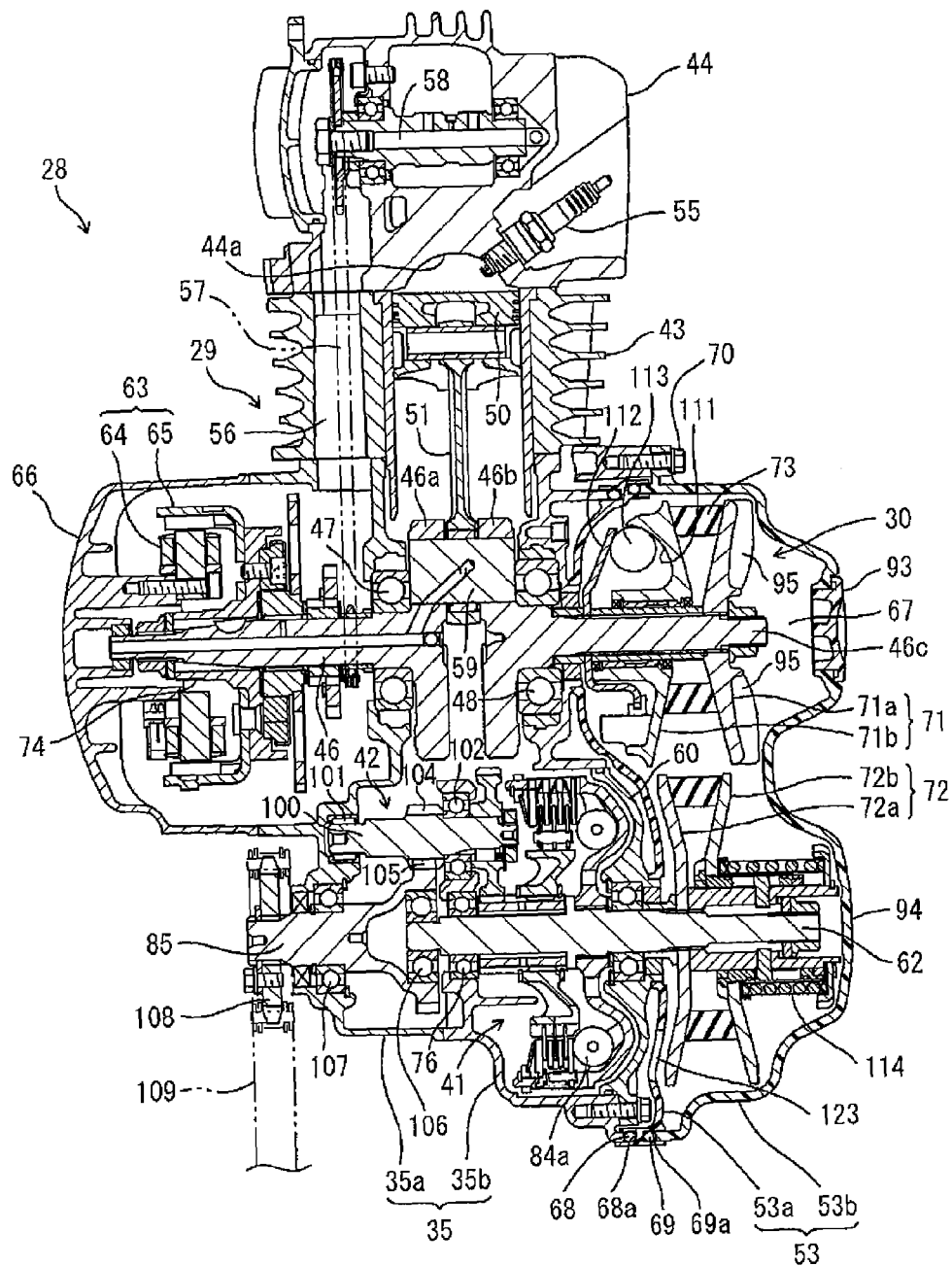
FIG. 6 is a cross sectional view of an internal structure of the engine unit of the invention.

Engine unit 28 comprises an engine 29 and a belt type continuously variable transmission (CVT) 30 (see FIG. 6). While the engine 29 is not limited in type, it comprises a 4-cycle single cylinder engine in the illustrated embodiment.

As shown in FIG. 1, the motorcycle 10 comprises a front fender 31, which covers upper and rear portions of the front wheel 19, and a rear fender 32, which covers a rearward and obliquely upward portion of the rear wheel 26.

The motorcycle 10 comprises a front cowl 33, and left and right leg shields 34L, 34R as well as the vehicle body cover 21. The leg shields 34L, 34R serve as a cover member, which covers the front of driver's legs and extends obliquely vertically as viewed from laterally. In addition, the leg shields 34L, 34R may be made integral with or separate from the front cowl 33.

Figure 2:
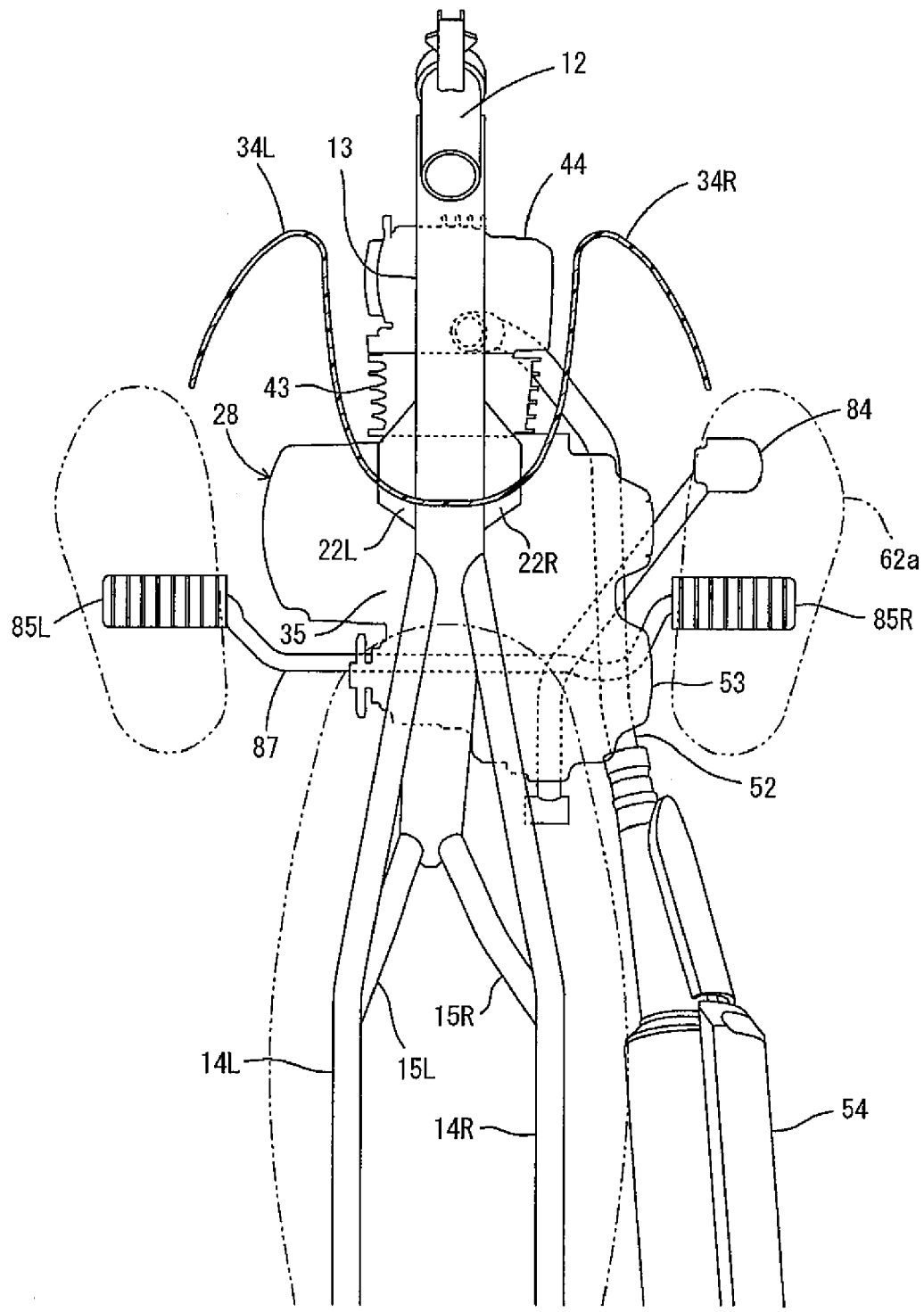
FIG. 2 is a plan view showing a positional relationship among a vehicle body frame, leg shields, an engine unit, etc. according to the invention.

As shown in FIG. 2, horizontal cross sections of the leg shields 34L, 34R are shaped to be open rearward and concave. In other words, the leg shields 34L, 34R are shaped in transverse cross section to be curved in a substantially C-shape to converge forward. Consequently, a space is provided on a back surface side (a concave-shaped inside) of the leg shields 34L, 34R, of which front and lateral portions are covered by the leg shields 34L, 34R.

According to the embodiment, the leg shields 34L, 34R are made of a resin material. However, the leg shields 34L, 34R are not limited in a material.

As shown in FIG. 2, foot rests 85L, 85R made of rubber or the like are arranged on the left and the right of the engine unit 28. The foot rests 85L, 85R comprise foot rest members, on which driver's feet are supported. The left and right foot rests 85L, 85R are supported on the crankcase 35 of the engine unit 28 through a metallic connecting rod 87 and a mount plate 88 (see FIGS. 3 and 4) fixed to the connecting rod 87.

Figure 3:
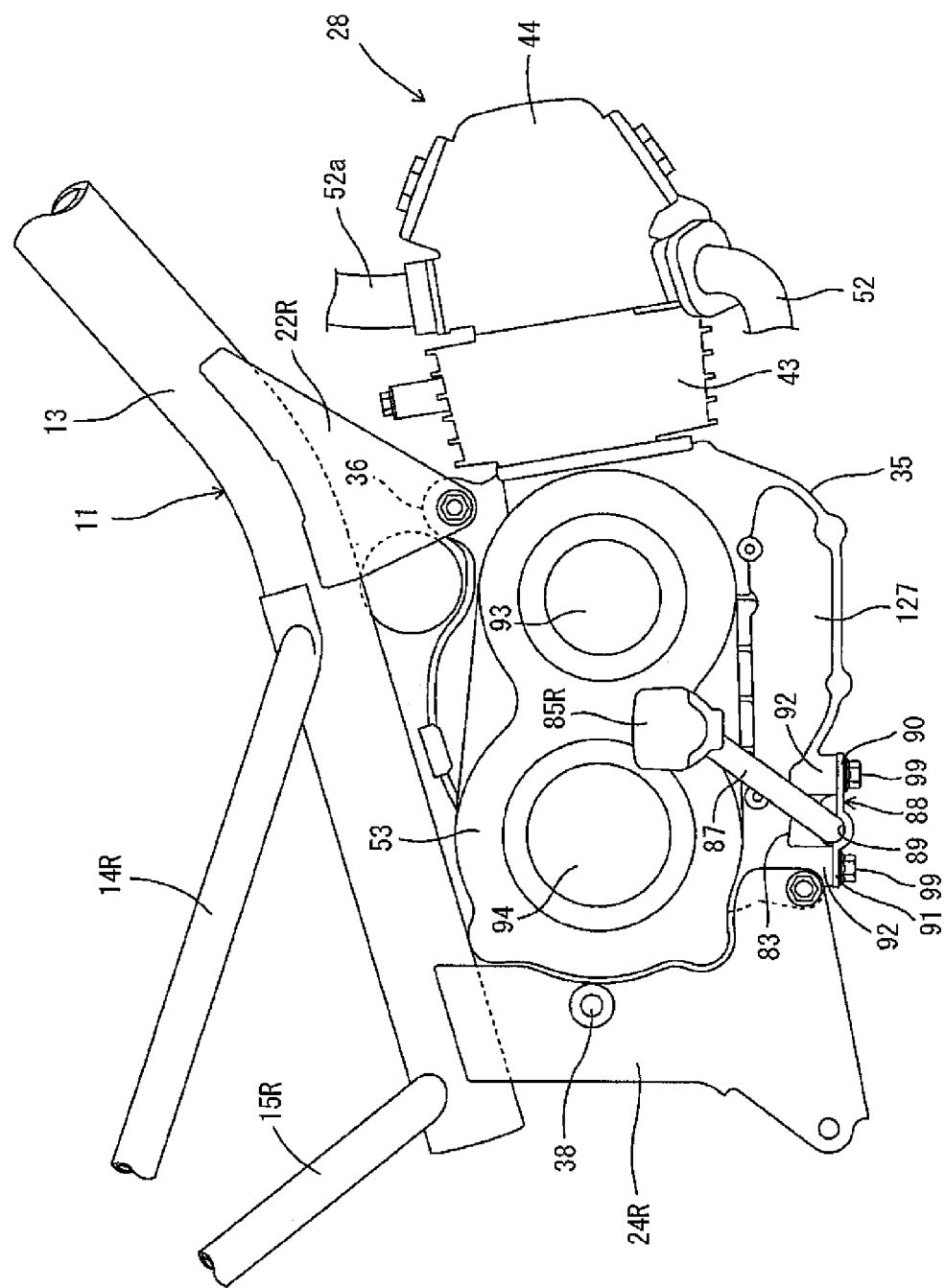
FIG. 3 is a right side view of the engine unit of the invention.

The connecting rod 87 passes below a rear half of the crankcase 35 to extend in the vehicle width direction. A left end of the connecting rod 87 projects on the left of the crankcase 35 to support the left foot rest 85L. A right end of the connecting rod 87 projects on the right of a transmission casing 53 to support the right foot rest 85R. As shown in FIG. 3, the mount plate 88 is formed by press-forming of a metallic sheet and a recess 89, into which the connecting rod 87 is fitted, is formed on a longitudinally intermediate portion of the mount plate 88. The recess 89 abuts the connecting rod 87 from under and is welded to an outer peripheral surface of the connecting rod 87.

The mount plate 88 comprises a first flange-shaped mount 90, which projects forwardly of the connecting rod 87, and a second flange-shaped mount 91, which projects rearwardly of the connecting rod 87. The first mount 90 and the second mount 91 are extended axially (a left and right direction) of the connecting rod 87 and opposed to a lower surface 83 of the rear half of the crankcase 35.

The lower surface 83 of the rear half of the crankcase 35 comprises four (only two are illustrated in FIG. 3) boss portions 92. The boss portions 92 project downward from the lower surface 83 of the crankcase 35 to be formed integral with the crankcase 35. Boss portions 92 are formed with bolt holes (not shown). Bolt holes (not shown) are also formed on the mount plate 88 of the foot rests 85L, 85R in positions corresponding to the boss portions 92. The mount plate 88 and the boss portions 92 are clamped by bolts 99. In this manner, the foot rests 85L, 85R are fixed through the connecting rod 87 and the mount plate 88 to the crankcase 35 by the bolts 99.

As shown in FIGS. 1 and 2, a brake pedal 84 is provided forwardly of the right foot rest 85R. The brake pedal 84 passes below the transmission casing 53 to project rightward and obliquely forward to extend forward and obliquely upward on the right of the transmission casing 53. As shown in FIG. 2, a driver's right foot 62a adjoins the transmission casing 53 in the vehicle width direction when the motorcycle 10 travels.

An explanation is now given to an internal structure of the engine unit 28. As shown in FIG. 6, the engine unit 28 comprises the engine 29, the CVT 30, a centrifugal clutch 41, and a speed reducer 42.

The engine 29 comprises the crankcase 35, the cylinder 43 connected to the crankcase 35, and the cylinder head 44 connected to the cylinder 43. The crankcase 35 comprises two split case blocks, that is, a first case block 35a positioned on the left and a second case block 35b positioned on the right. The first case block 35a and the second case block 35b abut each other in the vehicle width direction.

A crankshaft 46 is accommodated in the crankcase 35. The crankshaft 46 is extended in the vehicle width direction and arranged horizontally. The crankshaft 46 is supported on the first case block 35a with a bearing 47 therebetween and supported on the second case block 35b with a bearing 48 therebetween.

A piston 50 is inserted slidably into the cylinder 43. An end of a connecting rod 51 is connected to the piston 50. A crank pin 59 is provided between a left crank arm 46a and a right crank arm 46b of the crankshaft 46. The other end of the connecting rod 51 is connected to the crank pin 59.

Formed on the cylinder head 44 are a recess 44a, an intake port and an exhaust port, which are not shown but communicate with the recess 44a. An ignition plug 55 is inserted into the recess 44a of the cylinder head 44. As shown in FIG. 3, an intake pipe 52a is connected to the intake port and an exhaust pipe 52 is connected to the exhaust port. As shown in FIGS. 1 and 2, the exhaust pipe 52 is extended rearward, rightward, and obliquely downward from the cylinder head 44 and passes below the transmission casing 53 of the engine unit 28 to be extended further rearward to be connected to a muffler 54 arranged on the right side of the rear wheel 26.

As shown in FIG. 6, formed on a left side in the cylinder 43 is a cam chain chamber 56, which connects between an interior of the crankcase 35 and an interior of the cylinder head 44. A timing chain 57 is arranged in the cam chain chamber 56. The timing chain 57 is wound around the crankshaft 46 and a cam shaft 58. The cam shaft 58 rotates upon rotation of the crankshaft 46 to open and close an intake valve and an exhaust valve, which are not shown.

A generator casing 66 is detachably mounted to a left side of a front half of the first case block 35a to accommodate therein a generator 63. The transmission casing 53 is mounted to a right side of the second case block 35b to accommodate therein the CVT 30.

An opening is formed on a right side of a rear half of the second case block 35b and is closed by a clutch cover 60. The clutch cover 60 is detachably fixed to the second case block 35b by a bolt 61 (see FIG. 7).

The transmission casing 53 is formed independently of the crankcase 35 and comprises an inner casing 53a, which covers an inside (left) of the CVT 30 in the vehicle width direction, and an outer casing 53b, which covers an outside (right) of the CVT 30 in the vehicle width direction. The inner casing 53a is mounted to a right side of the crankcase 35 and the outer casing 53b is mounted to a right side of the inner casing 53a. A belt chamber 67 is formed in the inner casing 53a and the outer casing 53b to accommodate therein the CVT 30.

As shown in FIG. 6, a right end of the crankshaft 46 extends through the second case block 35b and the inner casing 53a to be extended to the belt chamber 67. The right end of the crankshaft 46 is fitted into a primary sheave 71 of the CVT 30. Therefore, the primary sheave 71 rotates upon rotation of the crankshaft 46. A right portion (strictly, a portion on the right of the bearing 48) of the crankshaft 46 is formed with a primary sheave shaft 46c.

On the other hand, a left end of the crankshaft 46 extends through the first case block 35a to be extended into the generator casing 66. The generator 63 is mounted to the left end of the crankshaft 46. The generator 63 comprises a stator 64 and a rotor 65 opposed to the stator 64. The rotor 65 is fixed to a sleeve 74 that rotates with the crankshaft 46. The stator 64 is fixed to the generator casing 66.

Figure 7:
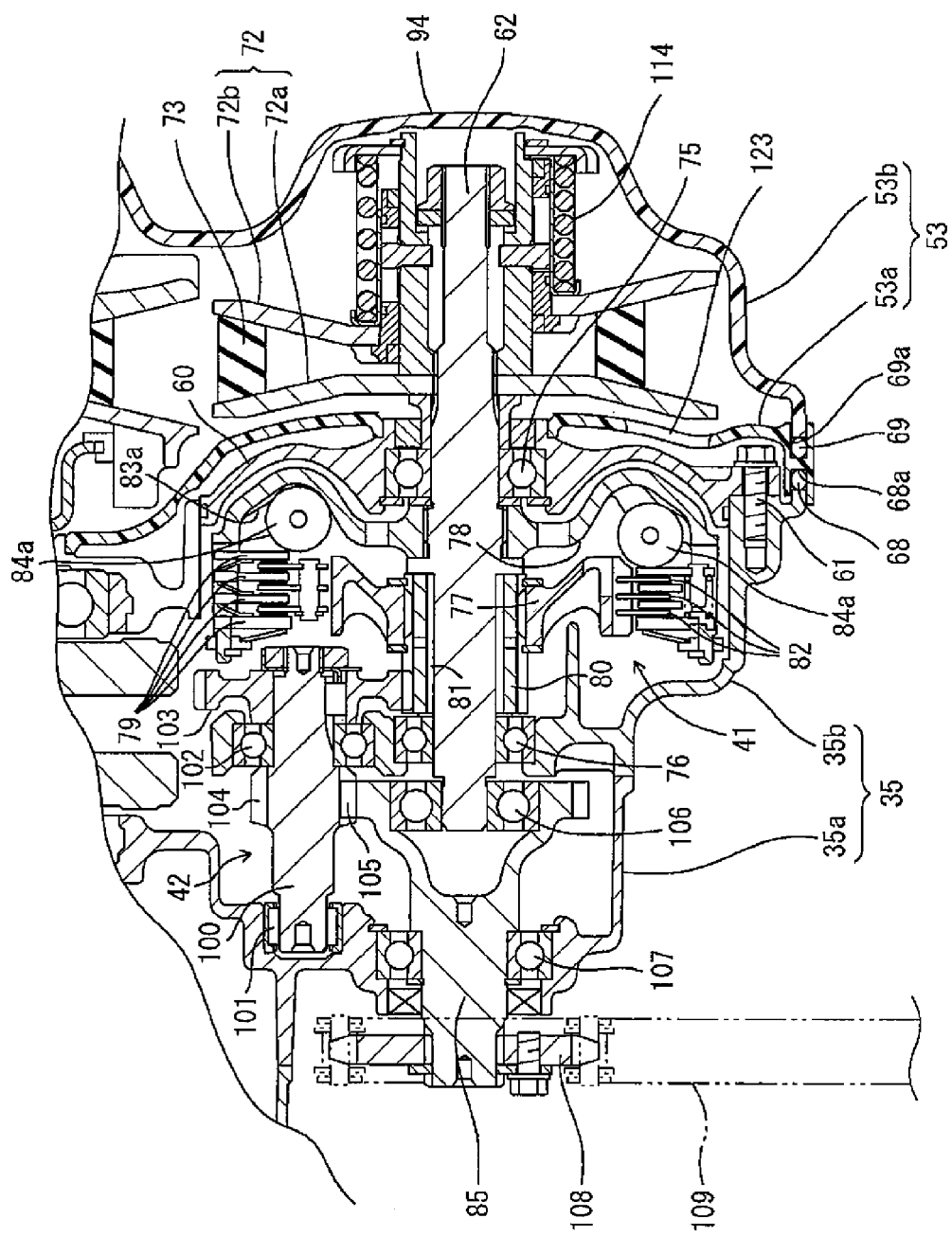
FIG. 7 is a partial cross sectional view of the internal structure of the engine unit of the invention.

A secondary sheave shaft 62 is arranged in the rear half of the crankcase 35 in parallel to the crankshaft 46. As shown in FIG. 7, a right portion of a central portion of the secondary sheave shaft 62 is supported on the clutch cover 60 with a bearing 75 therebetween. A left portion of the secondary sheave shaft 62 is supported on a left end of the second case block 35b with a bearing 76 therebetween. A right end of the secondary sheave shaft 62 extends through the second case block 35b and the clutch cover 60 to the belt chamber 67. A secondary sheave 72 of the CVT 30 is connected to the right end of the secondary sheave shaft 62.

Figure 8:
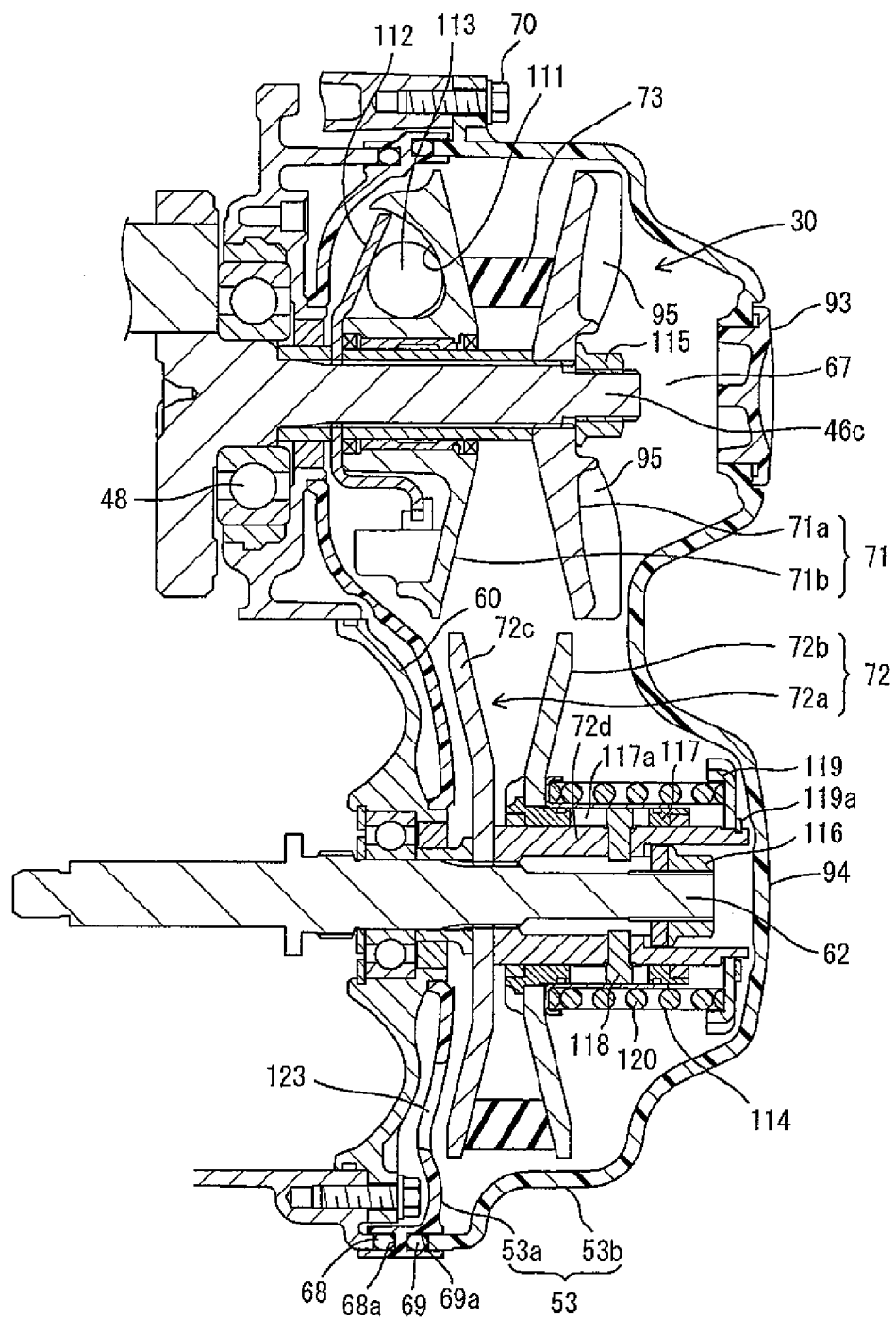
FIG. 8 is a partial cross sectional view of the internal structure of the engine unit of the invention.

As shown in FIG. 8, the CVT 30 comprises the primary sheave 71, the secondary sheave 72, and a V-belt 73 wound around the primary sheave 71 and the secondary sheave 72. As described above, the primary sheave 71 is mounted to the primary sheave shaft 46c. The secondary sheave 72 is connected to an outside of the secondary sheave shaft 62 in the vehicle width direction.

The primary sheave 71 comprises a stationary sheave half 71a positioned outward in the vehicle width direction and a movable sheave half 71b positioned inward in the vehicle width direction and opposed to the stationary sheave half 71a. The stationary sheave half 71a is clamped and fixed to a right end of the primary sheave shaft 46c by a lock nut 115 to rotate with the primary sheave shaft 46c. The movable sheave half 71b is arranged on the left of the stationary sheave half 71a and mounted slidably to the primary sheave shaft 46c. Accordingly, the movable sheave half 71b rotates with the primary sheave shaft 46c and is slidable axially of the primary sheave shaft 46c. A belt groove is formed between the stationary sheave half 71*a* and the movable sheave half 71*b*. A cam surface 111 is formed on a left portion of the movable sheave half 71*b* and a cam plate 112 is arranged on the left of the cam surface 111. A roller weight 113 is arranged between the cam surface 111 of the movable sheave half 71*b* and the cam plate 112. Also, a plurality of vanes 95 are formed on a right portion of the stationary sheave half 71*a* of the primary sheave 71 to blast cooling air.

The secondary sheave 72 comprises a stationary sheave half 72*a* positioned inward in the vehicle width direction and a movable sheave half 72*b* positioned outward in the vehicle width direction and opposed to the stationary sheave half 72*a*. The movable sheave half 72*b* is mounted to the right end of the secondary sheave shaft 62. The movable sheave half 72*b* rotates with the secondary sheave shaft 62 and is slidable axially of the secondary sheave shaft 62. The stationary sheave half 72*a* comprises a sheave body 72*c*, which is substantially in the form of a doughnut plate and around which the V-belt 73 is wound, and a substantially cylindrical-shaped boss portion 72*d* extending rightward from a right side of the sheave body 72*c*. The sheave body 72*c* and the boss portion 72*d* are separate from each other. The sheave body 72*c* and the boss portion 72*d* contact each other without being joined by welding or clamped by a fastener such as rivet or the like.

Both the sheave body 72*c* and the boss portion 72*d* are spline-fitted onto the secondary sheave shaft 62. Therefore, the sheave body 72*c* and the boss portion 72*d* rotate integrally in a state, in which a right surface of the sheave body 72*c* and a left surface of the boss portion 72*d* abut. Also, the right surface of the sheave body 72*c* and the left surface of the boss portion 72*d* contact each other.

A cylindrical-shaped boss 117 provided on a shaft core of the movable sheave half 72*b* is provided on the boss portion 72*d* to be slidable axially of the boss portion 72*d*. A slide groove 117*a* inclined relative to an axial direction is formed on the boss 117 to be slit. A guide pin 118 is implanted in the boss portion 72*d*. The guide pin 118 engages slidably with the slide groove 117*a*. Also, the guide pin 118 engages with the slide groove 117*a* whereby the boss portion 72*d* rotates relative to the boss 117 within a particular range while the boss portion 72*d* rotates with the boss 117 when the range is exceeded. In addition, a torque cam mechanism is constituted by the boss 117, which is formed with the slide groove 117*a*, and the guide pin 118, which engages with the slide groove 117*a*.

A spring bearing member 119 comprising an annular plate is mounted on a right tip end of the boss portion 72*d* of the stationary sheave half 72*a* by a circlip 119*a*. A coil spring 120 in a compressed state is interposed between the spring bearing member 119 and the movable sheave half 72*b*. A lock nut 116 is clamped to a tip end of the secondary sheave shaft 62 in a state, in which the sheave body 72*c* of the stationary sheave half 72*a* and the boss portion 72*d* are interposed inside. Clamping by the lock nut 116 causes the sheave body 72*c* and the boss portion 72*d* to be fixed together in a state of surface contact.

A reduction ratio in the CVT 30 is decided by the magnitude correlation of a force, with which the roller weight 113 pushes the movable sheave half 71*b* of the primary sheave 71 rightward, and a force, with which the coil spring 120 pushes the movable sheave half 72*b* of the secondary sheave 72.

That is, when the primary sheave shaft 46*c* increases in rotational frequency, the roller weight 113 is exerted by a centrifugal force to move radially outward to push the movable sheave half 71*b* rightward. Then, the movable sheave half 71*b* is moved rightward, so that the primary sheave 71 is increased in belt wound diameter. In keeping with this, the secondary sheave 72 is decreased in belt wound diameter, so that the movable sheave half 72*b* of the secondary sheave 72 is moved rightward against the bias of the coil spring 120. Consequently, V-belt 73 on primary sheave 71 is increased in wound diameter while the V-belt on secondary sheave 72 is decreased in wound diameter, so that the reduction ratio decreases.

On the other hand, when the primary sheave shaft 46*c* decreases in rotational frequency, a centrifugal force on the roller weight 113 decreases, so that the roller weight 113 is moved radially inward along the cam surface 111 of the movable sheave half 71*b* and the cam plate 112. Therefore, a force, with which the roller weight 113 pushes the movable sheave half 71*b* rightward, decreases. Then, the bias of the coil spring 120 exceeds the force relatively, so that the movable sheave half 72*b* of the secondary sheave 72 is moved leftward and the movable sheave half 71*b* of the primary sheave 71 is also moved leftward correspondingly. Consequently, the belt on the primary sheave 71 is decreased in wound diameter while the belt on the secondary sheave 72 is increased in wound diameter, so that the reduction ratio increases.

As shown in FIG. 6, the outer casing 53*b* comprises a first bulged portion 93 and a second bulged portion 94, which are bowl-shaped and bulged outward (rightward) in the vehicle width direction. The first bulged portion 93 and the second bulged portion 94 are aligned in a longitudinal direction. The first bulged portion 93 covers the primary sheave 71 and the second bulged portion 94 covers the secondary sheave 72.

A sealing groove 68*a* is formed on a left peripheral edge of the inner casing 53*a* and a right peripheral edge of the second case block 35*b* is fitted into the sealing groove 68*a*. In addition, an O-ring 68 is inserted between the inner casing 53*a* and the second case block 35*b* in the sealing groove 68*a*. Also, a sealing groove 69*a* is formed on a right peripheral edge of the inner casing 53*a* and a peripheral edge of the outer casing 53*b* is fitted into the sealing groove 69*a*. An O-ring 69 is inserted between the inner casing 53*a* and the outer casing 53*b* in the sealing groove 69*a*. The outer casing 53*b* and the second case block 35*b* are clamped by bolts 70 in a state, in which the inner casing 53*a* is interposed therebetween.

As shown in FIG. 7, the centrifugal clutch 41 is mounted to a left portion of the secondary sheave shaft 62. The centrifugal clutch 41 comprises a wet multi-disc type clutch provided with a substantially cylindrical-shaped clutch housing 78 and a clutch boss 77. The clutch housing 78 is spline-fitted onto the secondary sheave shaft 62 to rotate with the secondary sheave shaft 62. A plurality of ring-shaped clutch plates 79 are mounted to the clutch housing 78. The clutch plates 79 are aligned at intervals axially of the secondary sheave shaft 62.

A cylindrical-shaped gear 80 is fitted rotatably around the left portion of the secondary sheave shaft 62 with a bearing 81 therebetween. The clutch boss 77 is arranged radially inwardly of the clutch plates 79 and radially outwardly of the gear 80 to mesh with the gear 80. Therefore, the gear 80 rotates with the clutch boss 77. A plurality of ring-shaped friction plates 82 are mounted radially outwardly of the clutch boss 77. The friction plates 82 are aligned at intervals axially of the secondary sheave shaft 62, the respective friction plates 82 being arranged between adjacent clutch plates 79, 79.

A plurality of cam surfaces 83*a* are formed on a left side of the clutch housing 78. Roller weights 84*a* are arranged between the cam surfaces 83*a* and the right-most clutch plate 79 opposed to the cam surfaces 83*a*.

The centrifugal clutch 41 is automatically switched between a clutch-in state (connected state) and a clutch-off state (disconnected state) according to the magnitude of a centrifugal force acting on the roller weights 84a.

That is, when a rotational speed of the clutch housing 78 becomes equal to or larger than a predetermined speed, the roller weights 84a are exerted by a centrifugal force to move radially outward, so that the clutch plates 79 are pushed leftward by the roller weights 84a. Consequently, the clutch plates 79 and the friction plates 82 are brought into pressure contact with each other to come in the clutch-in state, in which a driving force of the secondary sheave shaft 62 is transmitted to an output shaft 85 through the centrifugal clutch 41.

On the other hand when a rotational speed of the clutch housing 78 becomes less than the predetermined speed, a centrifugal force acting on the roller weights 84a decreases, so that the roller weights 84a move radially inward. Consequently, pressure contact between the clutch plates 79 and the friction plates 82 is released, so that the clutch-off state, in which a driving force of the secondary sheave shaft 62 is not transmitted to the output shaft 85, comes out. In addition, in FIG. 7, a front portion (an upper side in FIG. 7) in the centrifugal clutch 41 represents the clutch-off state and a rear portion (a lower side in FIG. 7) represents the clutch-in state.

The speed reducer 42 is interposed between the centrifugal clutch 41 and the output shaft 85 (see FIG. 6). The speed reducer 42 includes a speed change shaft 100 arranged in parallel to the secondary sheave shaft 62 and the output shaft 85. The speed change shaft 100 is supported rotatably on the first case block 35a with a bearing 101 therebetween and supported rotatably on the second case block 35b with a bearing 102 therebetween. Provided on a right end of the speed change shaft 100 is a first speed change gear 103 (see FIG. 7), which meshes with the gear 80.

Provided centrally on the speed change shaft 100 is a second speed change gear 104, which is smaller in diameter than the first speed change gear 103. Formed on an outer peripheral side of a right end of the output shaft 85 is a third speed change gear 105, which meshes with the second speed change gear 104. The inner peripheral side of the right end of the output shaft 85 is supported on a left end of the secondary sheave shaft 62 with a bearing 106 therebetween. Accordingly, the output shaft 85 is supported rotatably on the secondary sheave shaft 62 with the bearing 106 therebetween to be arranged coaxially (on a straight line) with the secondary sheave shaft 62. Also, a central portion of the output shaft 85 is supported rotatably on the left end of the second case block 35b with a bearing 107 therebetween.

With such construction, the clutch boss 77 and the output shaft 85 are connected to each other through the gear 80, the first speed change gear 103, the speed change shaft 100, the second speed change gear 104, and the third speed change gear 105. Therefore, the output shaft 85 rotates upon rotation of the clutch boss 77.

A left end of the output shaft 85 extends through the first case block 35a to project outside the crankcase 35. A drive sprocket 108 is fixed to the left end of the output shaft 85. Stretched around the drive sprocket 108 is a chain 109 as a power transmission mechanism that transmits a driving force of the output shaft 85 to the rear wheel 26. The power transmission mechanism is not limited to the chain 109 but may comprise other members such as a transmission belt, a gear mechanism composed of a combination of a plurality of gears, a drive shaft, etc.

An explanation is now given to an assembling process of the CVT 30.

Figure 9:
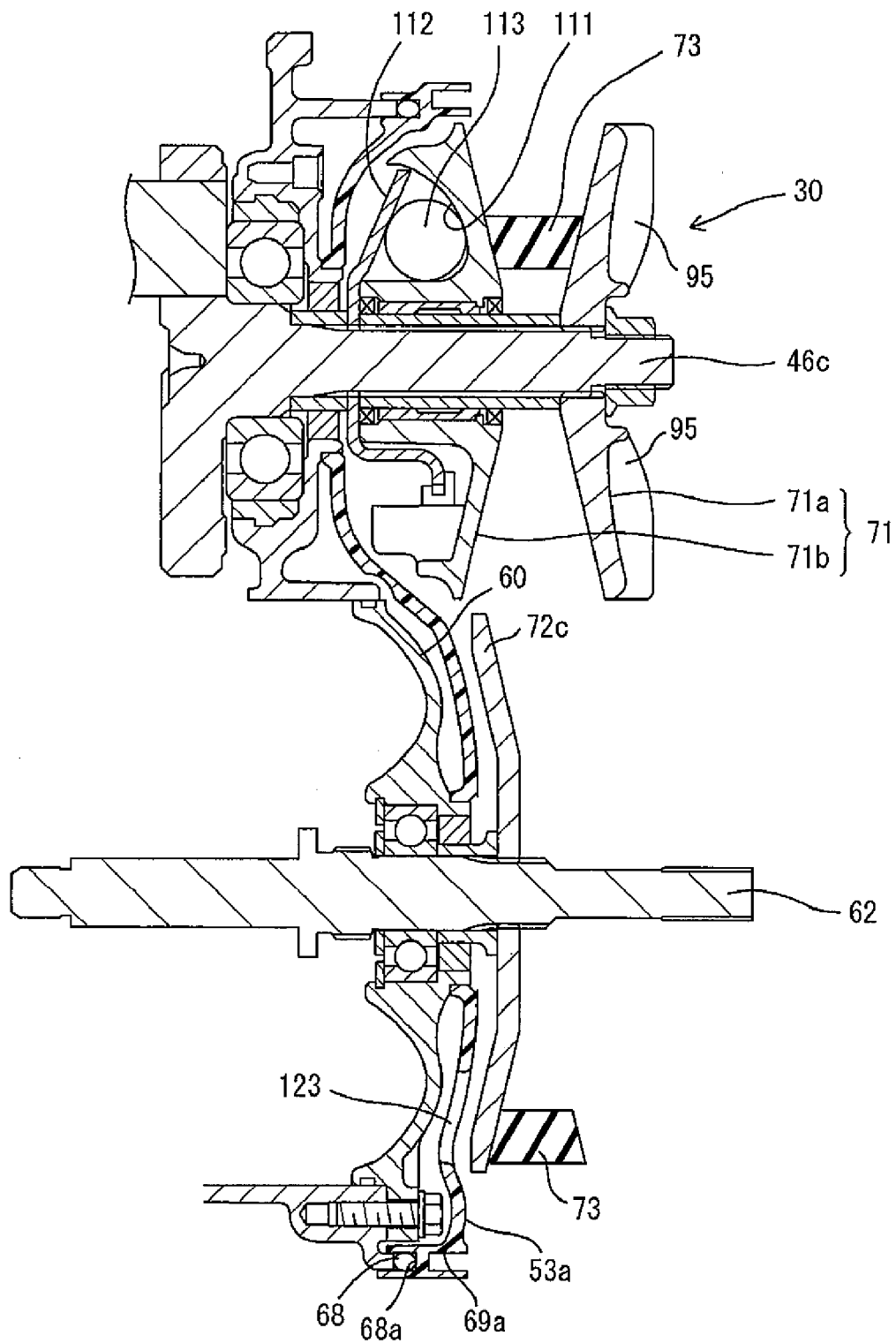
FIG. 9 is a view illustrating an assembling process of a V-belt type continuously variable transmission according to the invention.
Figure 10:
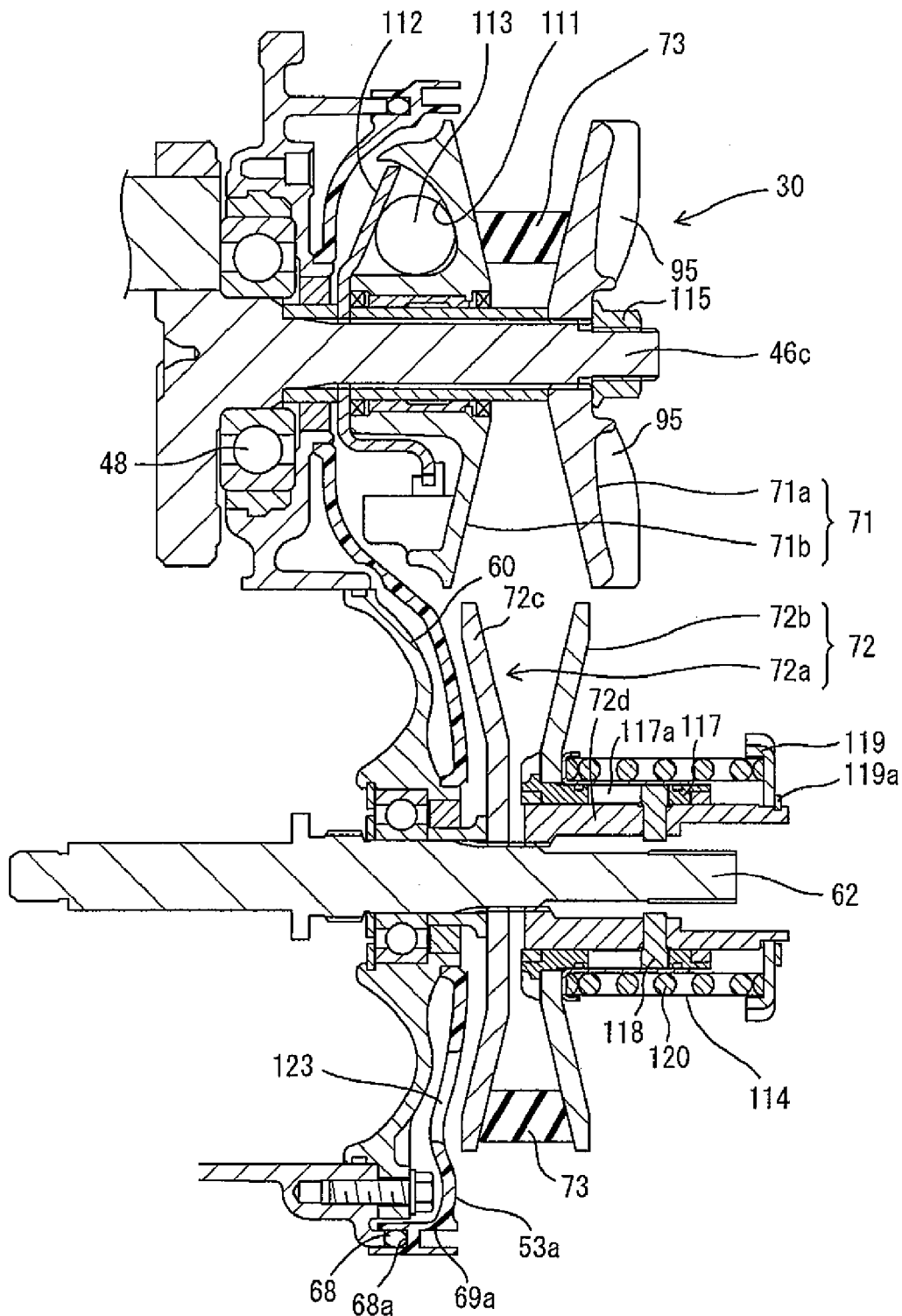
FIG. 10 is a view illustrating the assembling process of the V-belt type continuously variable transmission of the invention.
Figure 11:
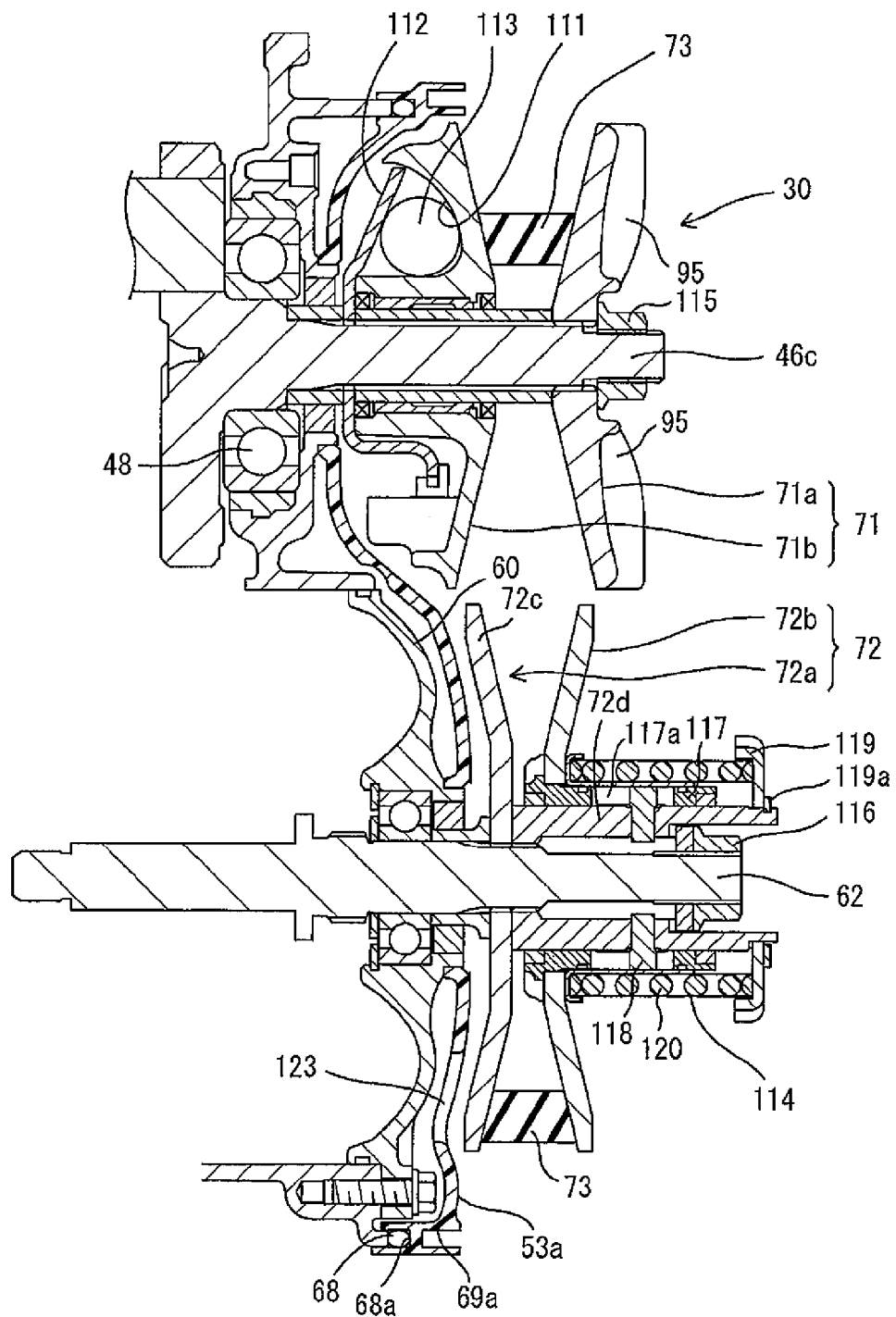
FIG. 11 is a view illustrating the assembling process of the V-belt type continuously variable transmission of the invention.

FIGS. 9-11 illustrate the assembling process of the CVT 30 in the motorcycle of FIGS. 1-8. In assembling CVT 30, the primary sheave 71 is first mounted to the primary sheave shaft 46c as shown in FIG. 9, and subsequently, only the sheave body 72c in the stationary sheave half 72a of the secondary sheave 72 is mounted to the secondary sheave shaft 62. Alternatively, after the sheave body 72c is mounted to the secondary sheave shaft 62, the primary sheave 71 is mounted to the primary sheave shaft 46c. Then the V-belt 73 is wound around the primary sheave 71 and the sheave body 72c to be arranged in an appropriate position. In addition, any spring or the like, which biases the stationary sheave half 71a and the movable sheave half 71b in a direction to make them approach each other, is not provided on the primary sheave 71. Therefore, a width of the belt groove is readily regulated with hands. Accordingly, V-belt 73 is readily arranged in an appropriate position.

Subsequently, as shown in FIG. 10, the boss portion 72d of the stationary sheave half 72a is mounted to the secondary sheave shaft 62 in a state, in which the V-belt 73 is arranged in an appropriate position. Mounted beforehand to the boss portion 72d to be made integral therewith are the movable sheave half 72b, to which the boss 117 is fixed, the guide pin 118, the spring bearing member 119, the circlip 119a, and the coil spring 120. Accordingly, the process of FIG. 10 is performed in only one process, in which the boss portion 72d having been made integral is inserted into the secondary sheave shaft 62. In addition, the lock nut 116 (see FIG. 8) is not mounted to the boss portion 72d, to which the movable sheave half 72b, etc. described above are mounted.

In a state shown in FIG. 10, the boss portion 72d, to which the movable sheave half 72b, etc. are mounted, is not clamped and fixed by means of the lock nut 116, so that it is possible to slidingly move the boss portion 72d axially of the secondary sheave shaft 62 without contracting the coil spring 120 for biasing. Therefore, coil spring 120 is not biased even when V-belt 73 is arranged in an appropriate position.

In a state, in which the V-belt 73 is held in an appropriate position, the lock nut 116 is clamped to the secondary sheave shaft 62, as shown in FIG. 11, to fix the secondary sheave shaft 62 and the boss portion 72d together. In this process, since the lock nut 116 is clamped against the bias of the coil spring 120, a relatively large force is needed. However, the work of clamping the lock nut 116 is relatively simple and can be performed with the use of a general purpose, inexpensive tool or the like.

As described above, the stationary sheave half 72a of the secondary sheave 72 is composed of the sheave body 72c and the boss portion 72d, the sheave body 72c and the boss portion 72d being separate from each other. Therefore, complex work with the use of a jig is not necessary when the assembling method described above is adopted. That is, that work, in which the V-belt 73 is moved outside the primary sheave 71 while enlarging an interval between the stationary sheave half 72a of the secondary sheave 72 and the movable sheave half 72b against the bias of the coil spring 120, is dispensed with. Thus, the assembling process of CVT 30 is simplified.

Since the sheave body 72c and the boss portion 72d are separate from each other, fixation costs associated with welding, rivets or the like are eliminated. It is also advantageous to eliminate welding since it causes deterioration in processing accuracy, and to eliminate rivets since they increase size and occupy limited arrangement space.

Also, according to the embodiment, a right side of the sheave body 72c of the stationary sheave half 72a and a left side of the boss portion 72d come into surface contact with each other. Therefore, even when the boss portion 72d pushes sheave body 72c owing to the bias of coil spring 120, contact portions are not damaged.

Also, lock nut 116 clamped to the secondary sheave shaft 62 is positioned outward relative to the secondary sheave 72, which is mounted to secondary sheave shaft 62, in the vehicle width direction. Therefore, mounting and maintenance of secondary sheave 72 is facilitated with transmission casing 53 removed.

Second Embodiment

A second embodiment described below differs from the first embodiment in the position in which secondary sheave 72 is arranged in a CVT.

Figure 12:
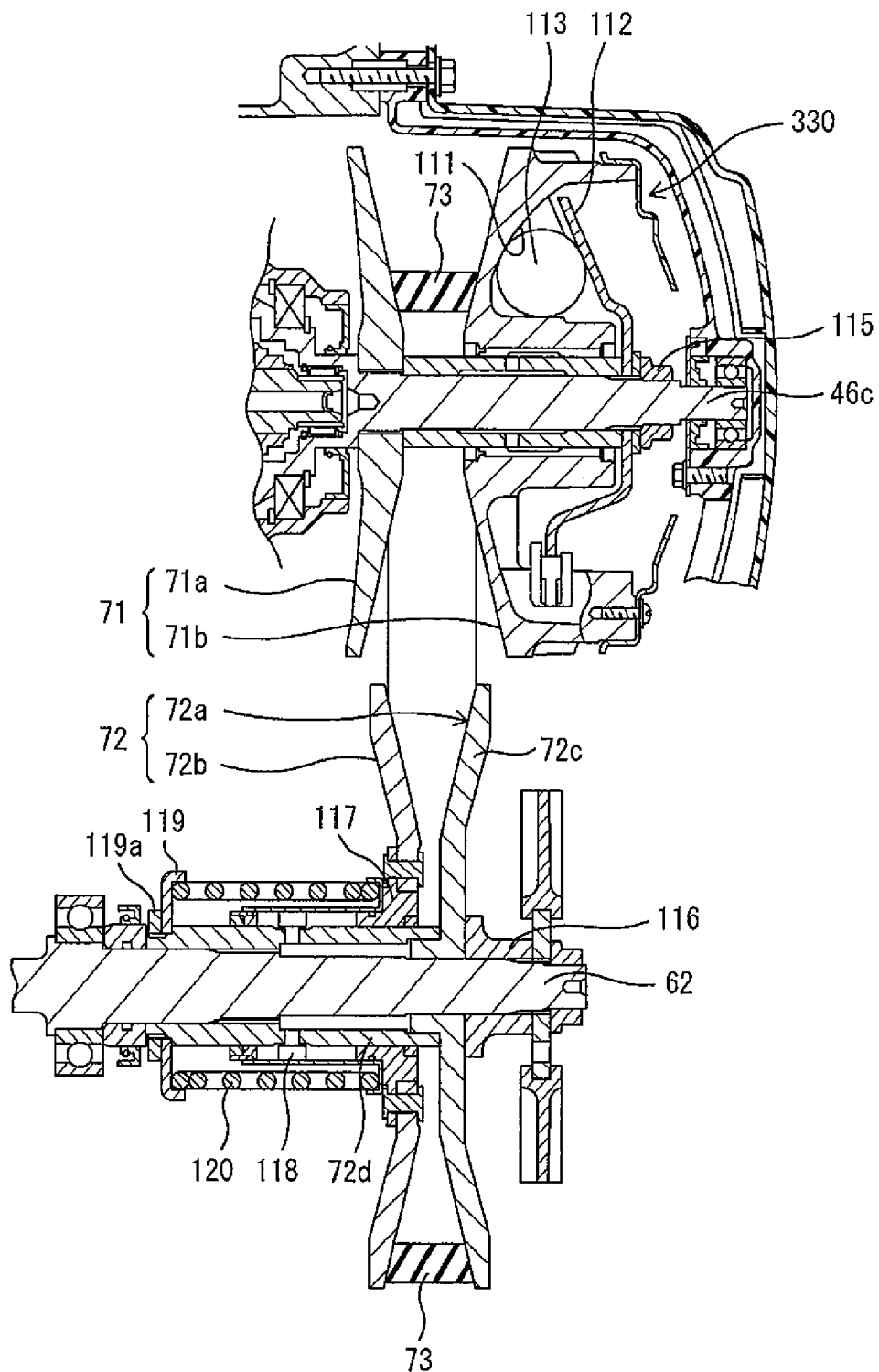
FIG. 12 is a cross sectional view showing, in enlarged scale, a neighborhood of a V-belt type continuously variable transmission in a motorcycle according to a second embodiment of the invention.
Figure 13:
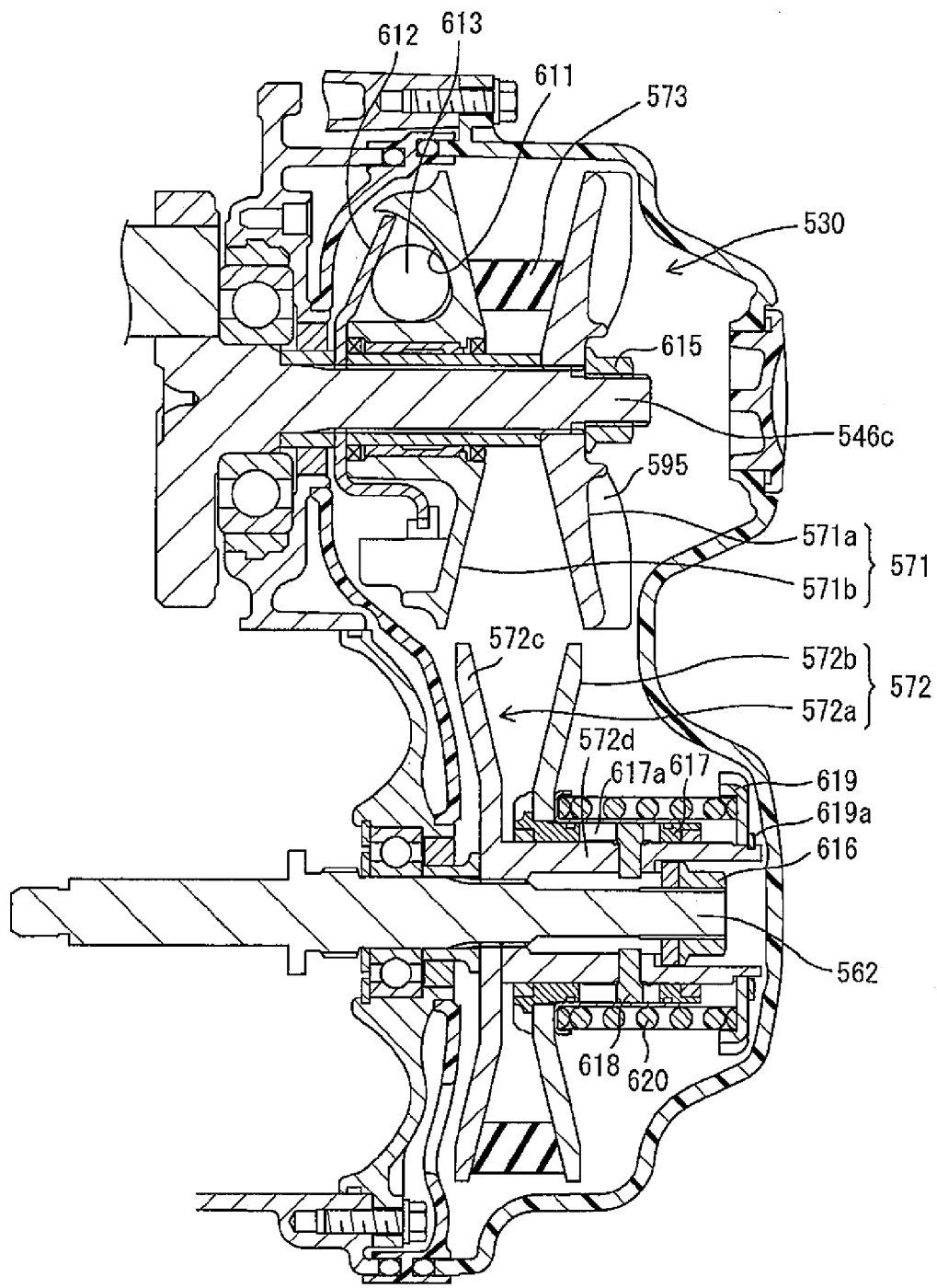
FIG. 13 is a view illustrating an assembling process of a V-belt type continuously variable transmission according to the related art.
Figure 14:
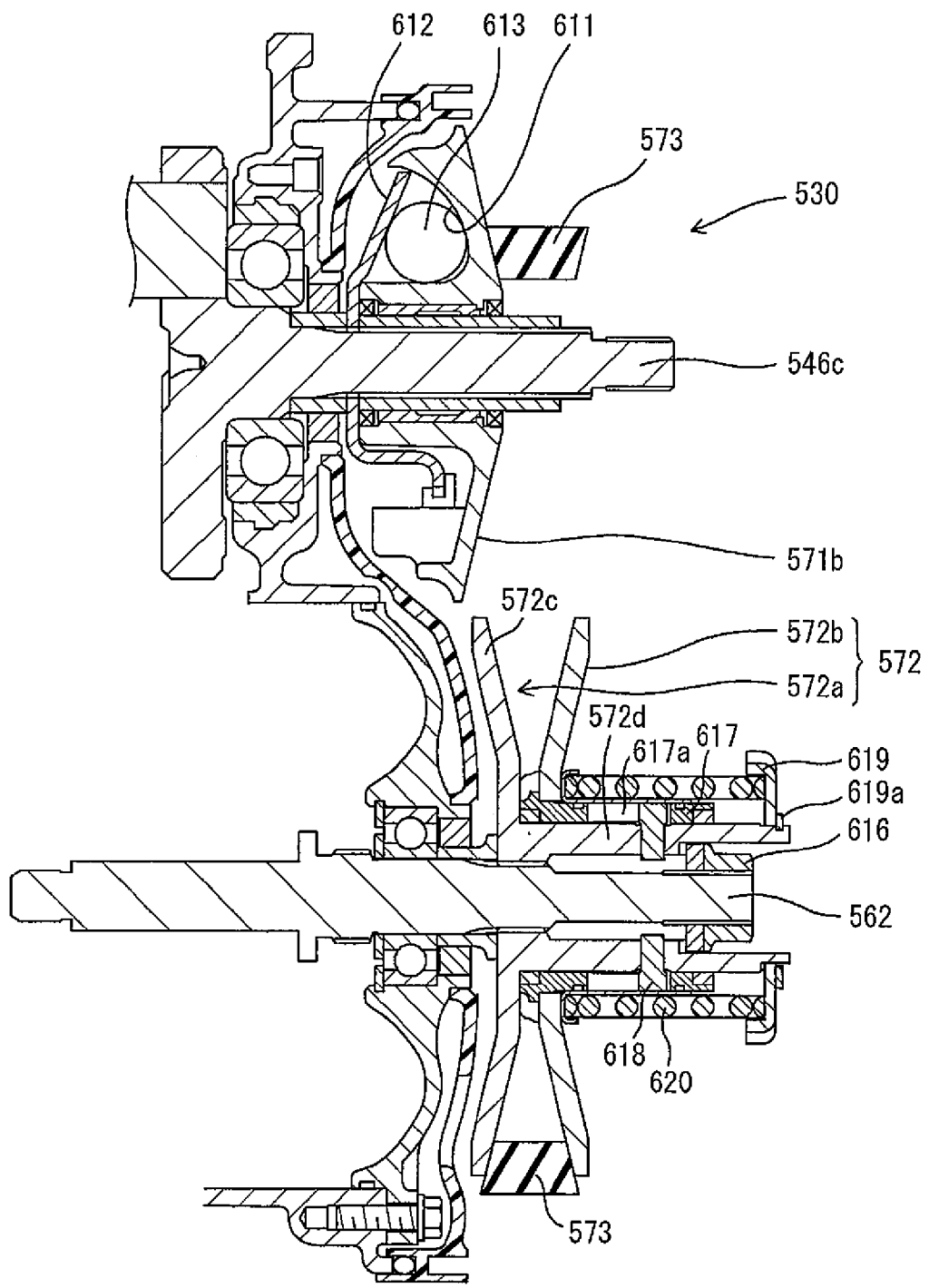
FIG. 14 is a view illustrating the assembling process of the V-belt type continuously variable transmission according to the related art.
Figure 15:
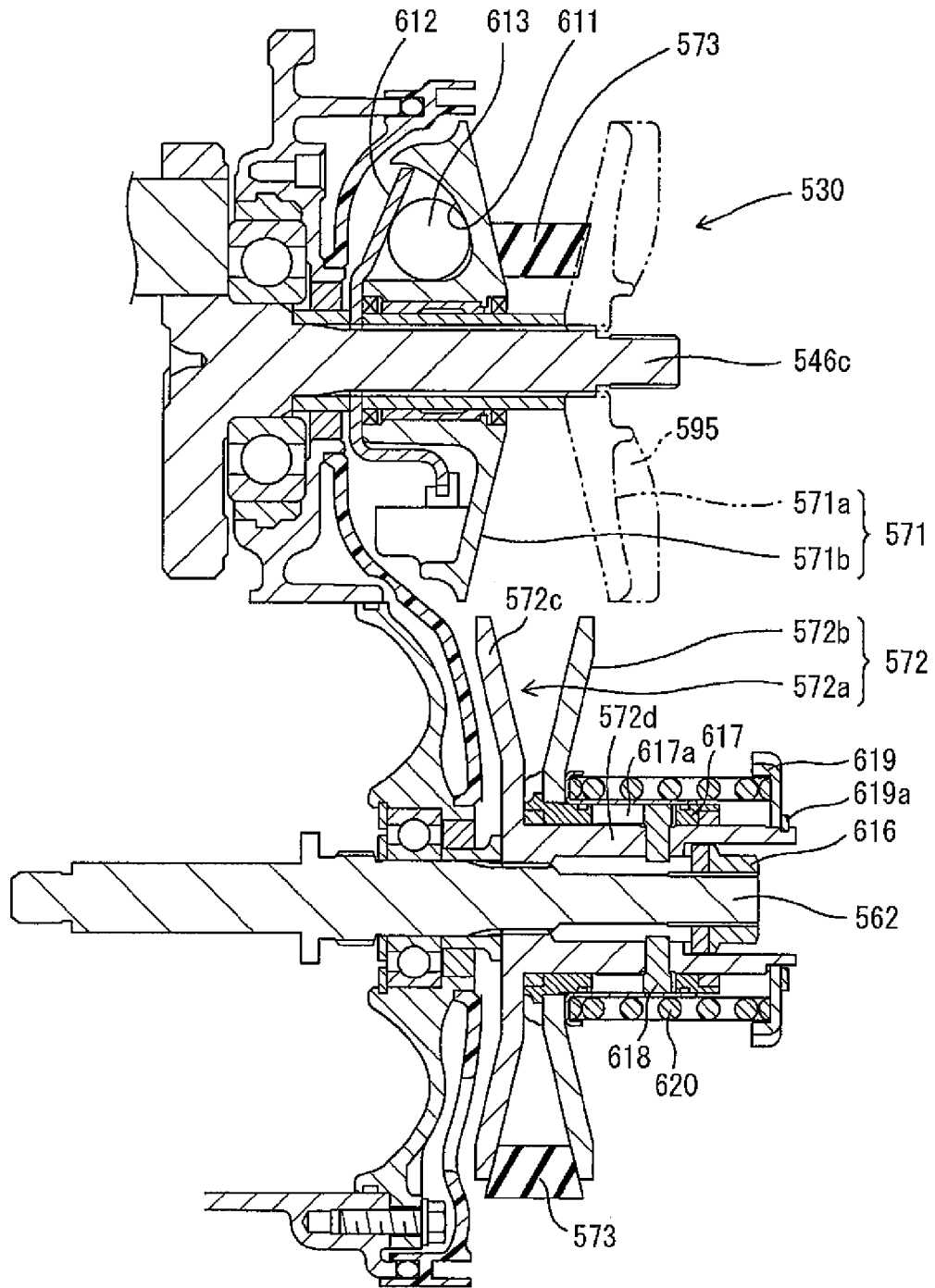
FIG. 15 is a view illustrating the assembling process of the V-belt type continuously variable transmission according to the related art.
Figure 16:
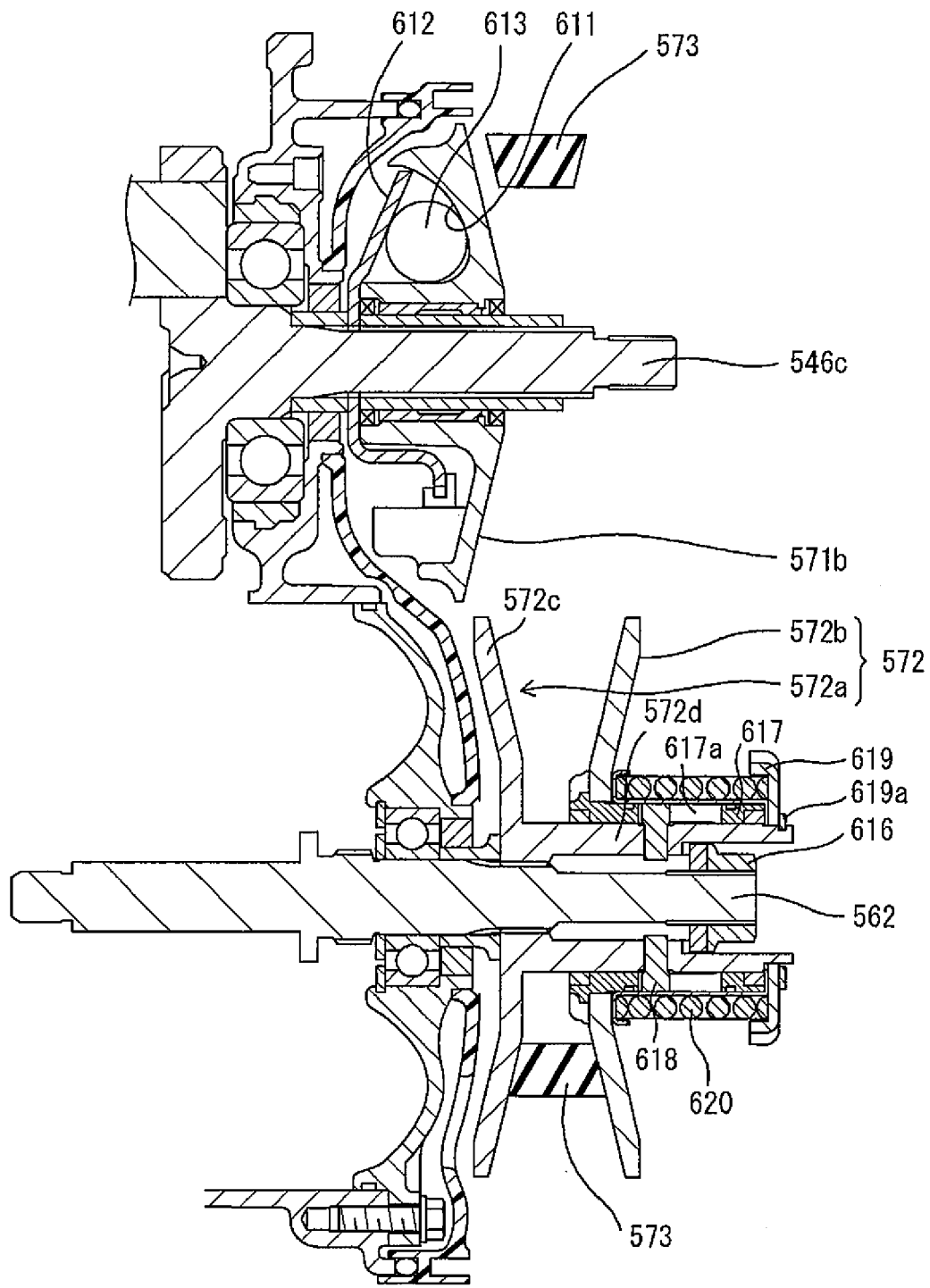
FIG. 16 is a view illustrating the assembling process of the V-belt type continuously variable transmission according to the related art.
Figure 17:
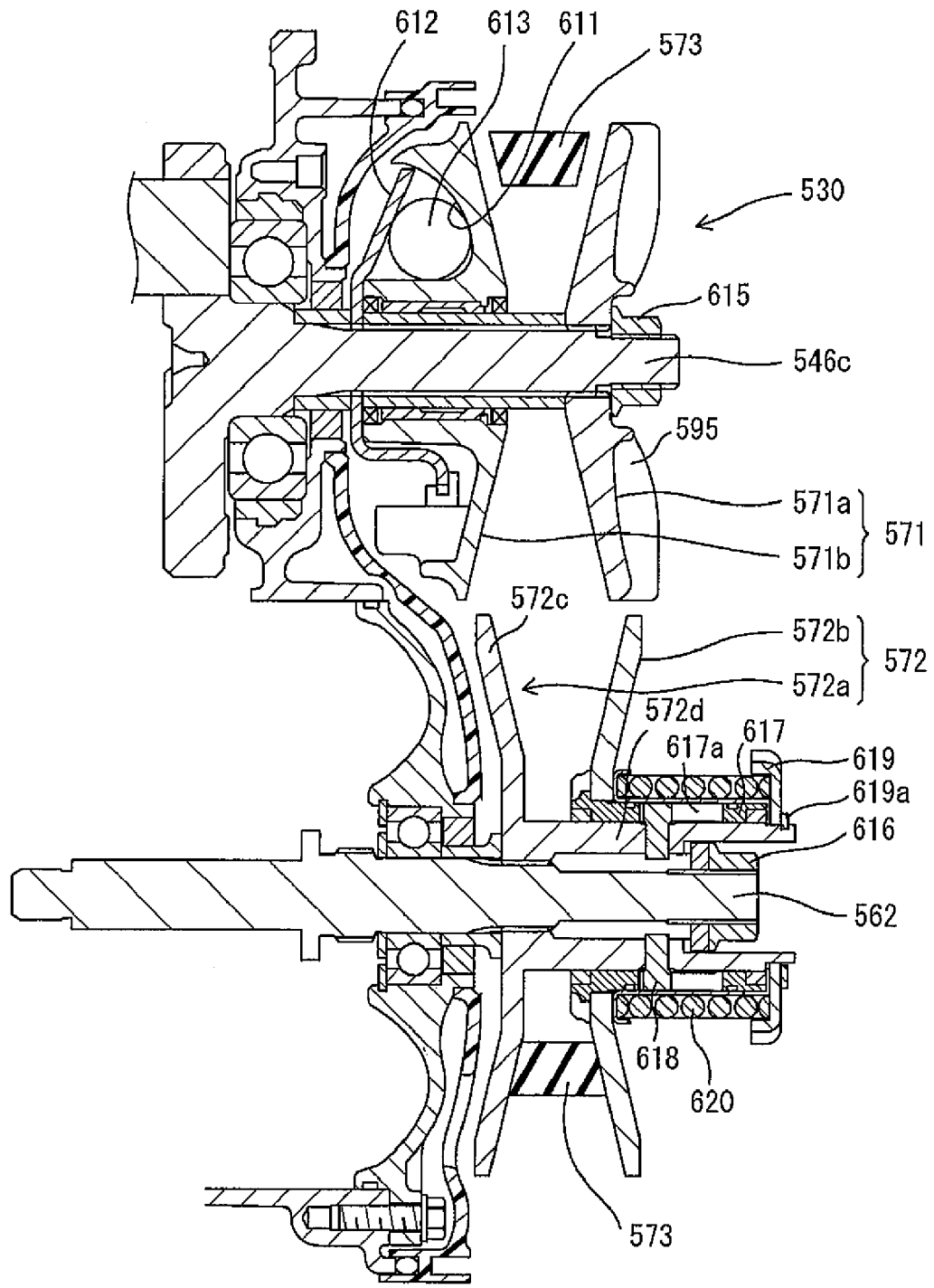
FIG. 17 is a view illustrating the assembling process of the V-belt type continuously variable transmission according to the related art.

FIG. 12 is a cross sectional view showing, in enlarged scale, a neighborhood of a CVT in a saddle-ride type vehicle (an ATV such as four-wheeled buggy whose description is omitted) according to the second embodiment. In FIG. 12, the same constituent parts as those of CVT 30 of FIG. 8 are denoted by the same reference numerals. As shown in FIG. 12, a primary sheave 71 is mounted to a primary sheave shaft 46c of a CVT 330 while a stationary sheave half 71a is arranged inward (on the left in the figure) in a vehicle width direction and a movable sheave half 71b is arranged outward (on the right in the figure) in the vehicle width direction. That is, positions of stationary sheave half 71a and movable sheave half 71b are reversed with respect to left and right as compared with FIG. 8. A roller weight 113 is arranged between a cam surface 111, which is formed on a right portion of the movable sheave half 71b, and a cam plate 112, which is arranged on the right of the cam surface 111. The cam plate 112 is clamped and fixed by a lock nut 115, which is mounted to a right end of the primary sheave shaft 46c.

Also, with the secondary sheave 72 mounted to a secondary sheave shaft 62, a stationary sheave half 72a is arranged outward in the vehicle width direction and a movable sheave half 72b is arranged inward in the vehicle width direction. That is, positions of the stationary sheave half 72a and the movable sheave half 72b are reversed with respect to left and right as compared with FIG. 8.

The movable sheave half 72b of the secondary sheave 72 comprises a sheave body 72c, which is substantially in the form of a doughnut plate, and a substantially cylindrical-shaped boss portion 72d extending leftward from a left side of the sheave body 72c. The sheave body 72c and the boss portion 72d are separate from each other in the same manner as in the first embodiment. Also, a guide pin 118 is implanted in the boss portion 72d, to which a boss 117, a spring bearing member 119, and a coil spring 120, respectively, are mounted. A lock nut 116 is mounted to a right end of the secondary sheave shaft 62 whereby the sheave body 72c is clamped and fixed.

In the process of assembling the CVT 330 shown in FIG. 12, the primary sheave 71 is first mounted to the primary sheave shaft 46c and the boss portion 72d, to which the boss 117 with the movable sheave half 72b fixed thereto, the guide pin 118, the spring bearing member 119, a circlip 119a, and a coil spring 120, respectively, are mounted, is mounted to the secondary sheave shaft 62. That is, only the sheave body 72c is removed from the secondary sheave shaft 62. In a state, in which only the sheave body 72c is removed from the secondary sheave shaft 62, a V-belt 73 is arranged in an appropriate position, and then sheave body 72c is inserted into secondary sheave shaft 62 to be clamped and fixed by the lock nut 116.

The second embodiment can adopt the assembling method of the first embodiment. That is, even when stationary sheave half 72a of secondary sheave 72 is arranged outward in the vehicle width direction and the movable sheave half 72b is arranged inward in the vehicle width direction, the sheave body 72c of the stationary sheave half 72a and the boss portion 72d are formed separately, so that it is possible to adopt an assembling method, in which the V-belt 73 is held in an appropriate position in a state, in which only the sheave body 72c is removed, and then clamping is made with lock nut 116. In this case, like the first embodiment, any work of arranging the V-belt 73 against the bias of the coil spring 120 with the use of a jig is dispensed with, and the assembling process of CVT 330 is simplified.

The side of the sheave body 72c and a side of the boss portion 72d have been describe as coming into surface contact with each other in stationary sheave half 72a of the secondary sheave 72. However, the sheave body 72c and the boss portion 72d may mesh with each other without welding, rivet joints, etc. For example, a driving force of the boss portion 72d may be transmitted to the sheave body 72c by spline-fitting of the sheave body 72c and the boss portion 72d. By doing this, the positional relationship between the sheave body 72c and the boss portion 72d is stabilized during rotation of the secondary sheave 72.

Also, sheave body 72c has been described as substantially in the form of a doughnut plate. However, the sheave body does not necessarily have this shape. For example, a shaft core of the sheave body may be boss-shaped to project laterally (axially). By causing the boss portion to abut against a boss-shaped portion of the sheave body, the sheave body can be prevented from falling when the boss portion pushes the sheave body.

Also, sheave body 72c and boss portion 72d have been described as formed separately for stationary sheave half 72a of secondary sheave 72. However, a stationary sheave half of a primary sheave may be formed separately, or a movable sheave half in a primary sheave or a secondary sheave may be formed separately.

Also, engine 29 has been described as the driving force generating apparatus, however, another driving force generating apparatus such as a motor or the like may be used.

Also, according to the embodiment, a mechanical type CVT 30 has been described in which centrifugal force is used to change a speed change ratio. However, a so-called electrically-driven type CVT (ECVT), in which a speed change ratio is changed by an electric motor, could also be used.

An elastic body mounted directly or indirectly to the boss portion 72d is not limited to a coil spring 120 but may comprise an elastic body of another kind (for example, an air spring, etc.). In addition, "directly" referred to herein to means the case where an elastic body is mounted directly to the boss portion 72d, and "indirectly" means the case where an elastic body is mounted to the boss portion 72d through a further member.

As described above, the invention is useful for a V-belt type continuously variable transmission provided on saddle-ride type vehicles such as motorcycles, etc.

The particular embodiments of the invention described in this document should be considered illustrative, rather than restrictive. Modification to the described embodiments may be made without departing from the spirit of the invention as defined by the following claims.

The invention claimed is:

1. A V-belt type continuously variable transmission comprising:
   first and second sheave shafts;
   first and second sheaves rotating with the first and second sheave shafts; and
   a V-belt wound around the first and second sheaves, wherein the second sheave includes a first sheave half that rotates with the second sheave shaft and is axially stationary, a second sheave half that rotates with the second sheave shaft and is axially movable, and an elastic body that biases the second sheave half with an elastic force toward the first sheave half, the first sheave half includes a sheave body around which the V-belt is wound, and a boss portion that is separate from the sheave body, arranged to abut a side surface of the sheave body and to extend in an axial direction of the second sheave shaft from the side surface of the sheave body, and to which the elastic body is directly or indirectly mounted, and the sheave body and the boss portion are each splined-fitted to the second sheave shaft, the elastic body is mounted around the boss portion with a first end thereof engaged with the boss portion and with a second end thereof engaged with the second sheave half, the second sheave half is arranged to move with respect to the boss portion in axial directions along the second sheave shaft with and against the elastic force of the elastic body, and a lock nut is threaded on the second sheave shaft with the lock nut engaged with the boss portion so that the boss portion abuts the side surface of the sheave body of the first sheave half.

2. The V-belt type continuously variable transmission according to claim 1, wherein the sheave body and the boss portion rotate integrally and contact each other.

3. The V-belt type continuously variable transmission according to claim 1, wherein the sheave body and the boss portion mesh with each other so that a driving force of the boss portion is transmitted to the sheave body.

4. The V-belt type continuously variable transmission according to claim 1, wherein the second sheave half includes a boss formed with a slide groove that extends in a direction inclined to the axial direction, and the boss portion of the first sheave half includes a guide pin arranged to slidably engage with the slide groove and constitutes a torque cam mechanism together with the slide groove.

5. A saddle-ride type vehicle comprising the V-belt type continuously variable transmission according to claim 1.

6. A method of manufacturing the V-belt type continuously variable transmission according to claim 1, the method comprising the steps of:

mounting the first sheave to the first sheave shaft, mounting the sheave body of the first sheave half of the second sheave to the second sheave shaft, winding the V-belt around the first sheave and the sheave body of the second sheave, mounting the boss portion, to which the second sheave half of the second sheave is beforehand mounted, to the second sheave shaft, and fastening the lock nut mounted on the second sheave shaft so that the boss portion abuts the side surface of the sheave body of the first sheave half.

* * * * *